US010852195B2

(12) United States Patent
Shima et al.

(10) Patent No.: US 10,852,195 B2
(45) Date of Patent: Dec. 1, 2020

(54) METHOD OF MEASURING TEMPERATURE OF AN OBJECT TO BE MEASURED, DUST TEMPERATURE AND DUST CONCENTRATION

(71) Applicants: MITSUBISHI MATERIALS CORPORATION, Tokyo (JP); UBE INDUSTRIES, LTD., Yamaguchi (JP); SUMITOMO OSAKA CEMENT CO., LTD., Tokyo (JP); TAIHEIYO CEMENT CORPORATION, Tokyo (JP)

(72) Inventors: Hirokazu Shima, Ibaraki (JP); Yoshiaki Takata, Ibaraki (JP)

(73) Assignees: MITSUBISHI MATERIALS CORPORATION, Tokyo (JP); UBE INDUSTRIES, LTD., Yamaguchi (JP); SUMITOMO OSAKA CEMENT CO., LTD., Tokyo (JP); TAIHEIYO CEMENT CORPORATION, Tokyo (JP)

( * ) Notice: Subject to any disclaimer, the term of this patent is extended or adjusted under 35 U.S.C. 154(b) by 351 days.

(21) Appl. No.: 15/758,835

(22) PCT Filed: Aug. 30, 2016

(86) PCT No.: PCT/JP2016/075338
§ 371 (c)(1),
(2) Date: Mar. 9, 2018

(87) PCT Pub. No.: WO2017/047376
PCT Pub. Date: Mar. 23, 2017

(65) Prior Publication Data
US 2020/0141809 A1 May 7, 2020

(30) Foreign Application Priority Data

Sep. 16, 2015 (JP) ................................ 2015-182656
Aug. 29, 2016 (JP) ................................ 2016-166714

(51) Int. Cl.
*G01J 5/00* (2006.01)
*G01J 5/60* (2006.01)
(Continued)

(52) U.S. Cl.
CPC ................ *G01J 5/602* (2013.01); *F27B 7/20* (2013.01); *F27B 7/42* (2013.01); *G01J 5/0018* (2013.01);
(Continued)

(58) Field of Classification Search
CPC ..... F27D 2019/0003; F27D 2019/0006; F27D 21/0014; G01J 5/00; G01J 5/0003;
(Continued)

(56) References Cited

U.S. PATENT DOCUMENTS 1,937,721 A * 12/1933 Simon .................... G01N 21/15
356/439
3,854,045 A * 12/1974 Breuer .................. G01N 21/53
250/341.3
(Continued)

FOREIGN PATENT DOCUMENTS

JP    52-005865 B1    2/1977
JP    54-051574 A     4/1979
(Continued)

OTHER PUBLICATIONS

International Search Report issued in WIPO Patent Application No. PCT/JP2016/075338, dated Nov. 22, 2016.
(Continued)

*Primary Examiner* — Gail Kaplan Verbitsky
(74) *Attorney, Agent, or Firm* — Greenblum & Bernstein, P.L.C.

(57) ABSTRACT

A first radiance meter is directed toward an object to be measured, radiance is measured through a space where dust is present with the use of at least two wavelengths by the first radiance meter, second radiance meters which are equal in number to one or more objects having temperatures different
(Continued)

from that of the object to be measured are directed toward the objects, radiances are measured through the space with the use of at least two wavelengths by the second radiance meters respectively, and a temperature of the object to be measured, a temperature of the dust, and concentration of the dust are measured from the radiances measured by the first radiance meter and the second radiance meters.

17 Claims, 10 Drawing Sheets

(51) Int. Cl.
     *F27B 7/20*     (2006.01)
     *F27B 7/42*     (2006.01)
     *F27D 19/00*    (2006.01)

(52) U.S. Cl.
    CPC .... G01J 5/0044 (2013.01); *F27D 2019/0003* (2013.01); *F27D 2019/0006* (2013.01); *G01J 2005/0051* (2013.01); *G01J 2005/607* (2013.01)

(58) Field of Classification Search
    CPC ....... G01J 2005/0077; G01J 2005/0081; G01J 5/0014; G01J 2005/0085; G01N 25/72; G01N 2203/0694; G01N 21/71; F24F 2110/50; F24F 2110/64; F24F 11/52; F24F 2110/10; B60H 1/008
    USPC .......................................... 374/120, 121, 45
    See application file for complete search history.

(56) References Cited

U.S. PATENT DOCUMENTS

| | | | |
|---|---|---|---|
| 4,144,758 A | 3/1979 | Roney | |
| 5,571,946 A * | 11/1996 | Koshi | G01N 5/02 73/28.01 |
| 6,266,428 B1 * | 7/2001 | Flanigan | G01N 21/3504 250/336.1 |
| 6,418,805 B1 * | 7/2002 | Carney | A01D 41/127 374/142 |
| 6,694,796 B2 * | 2/2004 | Juneau | G01N 15/0618 73/1.03 |
| 8,567,266 B2 * | 10/2013 | Kaminski | G01N 1/2205 73/863.51 |
| 9,863,812 B2 | 1/2018 | Shima et al. | |
| 10,254,263 B2 * | 4/2019 | Choi | F24F 11/77 |
| 2019/0145872 A1 * | 5/2019 | Woolsey | G01N 1/2247 73/863.12 |
| 2019/0310206 A1 * | 10/2019 | Na | G01N 21/94 |
| 2020/0096430 A1 * | 3/2020 | Yeon | G01N 15/06 |

FOREIGN PATENT DOCUMENTS

| | | | | |
|---|---|---|---|---|
| JP | 60220851 A | * | 11/1985 | ............. G01N 23/06 |
| JP | 5-306956 A | | 11/1993 | |
| JP | 8-152360 A | | 6/1996 | |
| JP | 2000-111398 A | | 4/2000 | |
| JP | 2001-249049 A | | 9/2001 | |
| JP | 2002-277327 A | | 9/2002 | |
| JP | 2004-271537 A | | 9/2004 | |
| JP | 2013-210259 A | | 10/2013 | |
| JP | 2015-175756 A | | 10/2015 | |

OTHER PUBLICATIONS

International Preliminary Report on Patentability issued in WIPO Patent Application No. PCT/JP2016/075338, dated Mar. 20, 2018, along with an English translation thereof.

Office Action for EP App. No. 16 846 247.1 dated Jun. 25, 2020.

\* cited by examiner

METHOD OF MEASURING TEMPERATURE OF AN OBJECT TO BE MEASURED, DUST TEMPERATURE AND DUST CONCENTRATION

TECHNICAL FIELD

The present invention relates to a method of measuring a temperature and the like of an object to be measured in an atmosphere where dust is present, e.g., an object to be heated in a high-temperature state in a furnace where dust is present, e.g., a rotary kiln provided in a cement manufacturing facility. It is to be noted that the present international application files a claim for priority based on Japanese Patent Application No. 182656 (Japanese Patent Application No. 2015-182656) filed on Sep. 16, 2015, and all contents of Japanese Patent Application No. 2015-182656 are applied to the present international application.

BACKGROUND ART

In general, in a furnace in which concentration of dust is high and a continuous treatment is performed, e.g., a rotary kiln provided in a cement manufacturing facility, to measure a temperature of an object to be heated, a radiation thermometer or the like which can measure temperatures in a contactless manner is used. This radiation thermometer is widely used in other baking furnaces than the rotary kiln or in a high-temperature process.

However, in the radiation thermometer, when dust is present between the object to be heated which is an object to be measured and an observer, attenuation of radiated light due to the dust and the radiated light from the dust itself affect, which results in a problem that a temperature of the object to be heated cannot be accurately measured. A two-color thermometer which is known as a noncontact thermometer obtains a temperature from a radiance ratio of two wavelengths, and this two-color thermometer can ignore an influence of the attenuation of the radiated light due to the dust which does not change the radiance ratio, but it cannot ignore an influence of the radiated light from the dust which changes the radiance ratio.

The above-described problem concerning the temperature measurement in the furnace having high dust concentration can of course occur in burning furnaces and the like other than a cement firing furnace. To solve such a problem, for example, there is disclosed a temperature measuring method which enables assuredly measuring a liquid level temperature of molten slag in a furnace having high soot dust concentration (see, e.g., Patent Document 1). According to this temperature measuring method, of radiant lights radiated from a liquid level of the molten slag accommodated in the furnace, radiant light in an intermediate infrared region or a far infrared region is concentrated on an photoelectric element, an output voltage having an amplitude corresponding to intensity of the incoming radiant light is generated from the photoelectric element, and the liquid level temperature of the molten slag is determined from this output voltage value and the Planck's law of radiation. Further, in this temperature measuring method, two or more radiant lights having different wavelengths are used.

Further, there is disclosed a flame light emission measuring apparatus using a condensing optical system in local measurement which is generally used to measure a microstructure of a flame (see, e.g., Patent Document 2). This measuring apparatus is characterized by including the condensing optical system formed of a single optical system which condenses spontaneous emissions from a plurality of measurement points of a flame onto corresponding condensing points on a condensing surface respectively and a spontaneous emission measuring system which allows measurement of the spontaneous emissions from the plurality of measurement points, which have been condensed on the condensing points.

PRIOR ART DOCUMENTS

Patent Documents

Patent Document 1: Japanese Unexamined Patent Application Publication No. 2001-249049 (claim 1, claim 2, claim 3, and Paragraph [0001])

Patent Document 2: Japanese Unexamined Patent Application Publication No. 2000-111398 (claim 1 and Paragraph [0003])

SUMMARY OF INVENTION

Problem to be Solved by the Invention

However, according to the conventional method disclosed in Patent Document 1, a particle diameter of dust which is an object is 1 to 2 μm, and this is extremely finer than that of dust in a cement firing kiln and the like. Thus, the method cannot be applied to the dust in the cement firing kiln and the like as it is, and cannot be used for temperature measurement of each of clinkers and the like. Likewise, in case of measuring a temperature of a heat transfer tube, a partition wall, or the like in a heat exchanger besides an object to be heated which is present in high-temperature furnaces (heating, smelting, refining, firing, reaction, and the like) other than the rotary kiln, and a solid or a liquid flowing through a duct such as a heat exchange tube in a boiler, the method cannot be applied if a particle diameter of dust is not fine as described above. Furthermore, like the local measurement using the condensing optical system disclosed in Patent Document 2, since a technique to simply reduce a volume to be measured cannot eliminate an influence of dust on an optical path and the like, it cannot be directly applied to the method for measuring a temperature of each of clinkers and the like in, e.g., a cement firing kiln having high dust concentration.

Thus, development of a method which can be applied to the measurement of a clinker temperature or the like in the cement firing kiln and is a more accurate measuring method than a conventional method using a two-color thermometer has been demanded.

It is an object of the present invention to provide a measuring method which enables to accurately measure a temperature or the like of an object to be measured in an atmosphere where dust is present, e.g., an object to be heated in a high-temperature state in a furnace where dust is present such as a rotary kiln included in a cement manufacturing facility.

Means for Solving Problem

A first aspect of the present invention is a method of measuring a temperature of an to be measured, a temperature of dust, and concentration of the dust, which includes: directing a first radiance meter toward the object to be measured and measuring a radiance through a space where the dust is present with the use of at least two wavelengths by the first radiance meter; directing second radiance meters, which are equal in number to one or more objects having temperatures different from that of the object to be measured, toward the objects, and measuring radiances through the space with the use of at least two wavelengths by the second radiance meters respectively; and measuring a temperature of the object to be measured, a temperature of the dust, and concentration of the dust from the radiances measured by the first radiance meter and the second radiance meters.

A second aspect of the present invention is an invention based on the first aspect, and is characterized in that the objects are blackbody cavities.

A third aspect of the present invention is an invention based on the first aspect, and is characterized in that the object to be measured is an object to be heated in a rotary kiln.

A fourth aspect of the present invention is an invention based on the third aspect, and is characterized in that the objects are blackbody cavities.

A fifth aspect of the present invention is an invention based on the third aspect, and is characterized in that the object is a discharge-end metal fitting of a rotary kiln.

A sixth aspect of the present invention is an invention based on the first aspect, and is characterized in that the objects are two objects which are an object having a temperature higher than that of the object to be measured and an object having a temperature lower than the object to be measured.

A seventh aspect of the present invention is an invention based on the sixth aspect, and is characterized in that the object to be measured is a object to be heated in a rotary kiln, the object having a temperature higher than that of the object to be measured is a flame of a burner, and the object having a temperature lower than that of the object to be measured is a discharge-end metal fitting provided in the rotary kiln.

An eighth aspect of the present invention is an invention based on the first, third, fifth, sixth, or seventh aspect, and is characterized in that measurement wavelengths for radiances are two wavelengths which are a wavelength $\lambda_1$ and a wavelength $\lambda_2$, and a numerical product of these wavelengths meets 0.8 or less when they are represented in units of μm.

A ninth aspect of the present invention is an invention based on the first, third, fifth, sixth, or seventh aspect, and is characterized in that measurement wavelengths for radiances are three wavelengths which are a wavelength $\lambda_1$, a wavelength $\lambda_2$, and a wavelength $\lambda_3$, measurement is performed with a combination of two of these wavelengths, and a temperature of the object to be measured, a temperature of the dust, and concentration of the dust are measured from obtained two temperatures of the object to be measured.

Effect of the Invention

In the method according to the first aspect of the present invention, the first radiance meter is directed toward the object to be measured, radiance is measured by the first radiance meter with at least two wavelengths through the space where the dust is present, the second radiance meters which are equal in number to one or more objects having temperatures different from that of the object to be measured are directed to the objects, radiances are measured by the second radiance meters with at least two wavelengths through the space respectively, and a temperature of the object to be measured, a temperature of the dust, and concentration of the dust are measured based on the radiances measured by the first radiance meter and the second radiance meters. Consequently, in this method, since an influence of the dust can be eliminated, an accuracy in the measurement of the temperature of the object to be measured can be increased. Moreover, since an influence of the radiance from the object to be measured can be eliminated from the temperature of the dust and the concentration of the dust which are hard to be measured by a conventional method, and hence the measurement can be highly accurately carried out.

In the method according to the second aspect of the present invention, the blackbody cavity is used as each object. The radiance from the blackbody cavity is very small. Thus, when the blackbody cavity is used as the object, more accurate radiance of the object to be measured can be calculated from measured values of the radiances measured by the first and second radiance meters, and hence a final measurement accuracy can be enhanced.

In the method according to the third aspect of the present invention, it is possible to measure with a very high accuracy a temperature of the object to be heated in the rotary kiln where concentration of the dust is high and a measurement accuracy of the temperature of the object to be measured is low, a temperature of the dust present between the object to be heated and the radiance meters, and the concentration of the dust. Since the temperature of the dust and the concentration of the dust can be measured, the method can be utilized for, e.g., operation control of a clinker cooler to improve heat recovery efficiency.

In the method according to the fourth aspect of the present invention, since the blackbody cavity is used as each object, for the above-described reason, it is possible to measure with a very high accuracy a temperature of the object to be heated in the rotary kiln, a temperature of the dust present between the object to be heated and the radiance meters, and concentration of the dust.

In the method according to the fifth aspect of the present invention, since a discharge-end metal fitting of the rotary kiln provided in a general cement manufacturing facility is used as the object, it is possible to measure with a very high accuracy a temperature of the object to be measured, a temperature of the dust, and concentration of the dust even in, e.g., the cement manufacturing facility where the blackbody cavity or the like cannot be installed as each object.

In the method according to the sixth aspect of the present invention, two objects, i.e., an object having a higher temperature than that of the object to be measured and an object having a lower temperature than that of the object to be measured are used as the objects, and the measurement is performed. Consequently, even if concentration of the dust is very high, it is possible to avoid a situation where radiation from the object having a high temperature is all absorbed by the dust and cannot be detected by the second radiance meter. Thus, a temperature of the object to be measured, a temperature of the dust, and concentration of the dust can be measured with a higher accuracy than that in case of performing the measurement with the use of, e.g., one object having a low temperature.

In the method according to the seventh aspect of the present invention, the object to be measured is the object to be heated in the rotary kiln, a flame of a burner included in the general cement manufacturing facility is used as the object having a higher temperature than that of the object to be measured, and the discharge-end metal fitting of the rotary kiln is used as the object having a lower temperature than that of the object to be measured. Thus, for example, even an apparatus in which the blackbody cavity or the like cannot be additionally installed as the object having a low temperature can measure a temperature of the object to be measured, a temperature of the dust, and concentration of the dust with a higher accuracy for the above-described reason.

In the method according to the eighth aspect of the present invention, the measurement wavelengths for the radiances are two wavelengths, i.e., the wavelength $\lambda_1$ and the wavelength $\lambda_2$, and a numerical product of the wavelength $\lambda_1$ and the wavelength $\lambda_2$ when they are represented in units of μm are assumed to meet a predetermined value or less. Consequently, for example, even in a case where an object having a temperature relatively close to that of the object to be measured is used as the object like the discharge-end metal substance provided in the general cement manufacturing facility, it is possible to measure a temperature of the object to be measured, a temperature of the dust, and concentration of the dust.

In the method according to the ninth aspect of the present invention, the measurement wavelengths for the radiances are three wavelengths, i.e., the wavelength the wavelength $\lambda_2$, and the wavelength $\lambda_3$, the measurement is performed by using a combination of two of these wavelengths, and a temperature of the object to be measured, a temperature of the dust, and concentration of the dust are measured from two resultant temperatures of the object to be measured. Consequently, for example, like the discharge-end metal fitting provided in the general cement manufacturing facility, even when the object having a temperature relatively close to that of the object to be measured is used as the object, a temperature of the object to be measured, a temperature of the dust, and concentration of the dust can be measured with a high accuracy.

BEST MODE(S) FOR CARRYING OUT THE INVENTION

Figure 1:
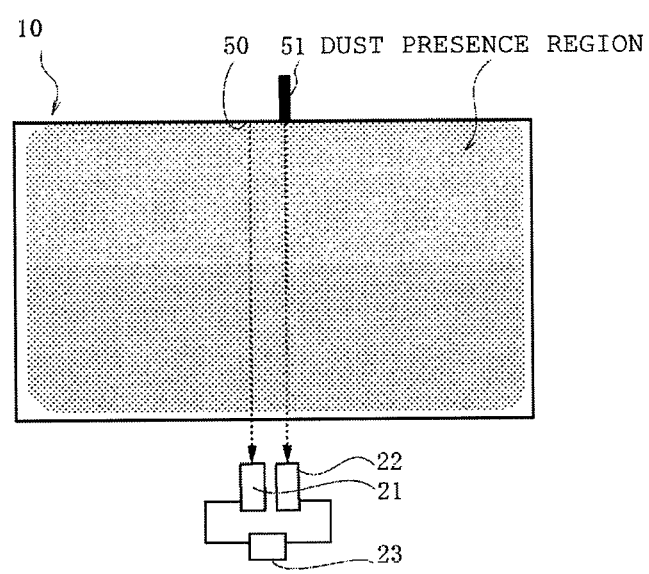
FIG. 1 is a top view to describe a measuring method according to a first embodiment of the present invention.

Modes for carrying out the present invention will now be described with reference to the drawings. It is to be noted that, in FIG. 1 to FIG. 6, like reference numerals denote like parts or the like. Further, in this specification, dust means a dust group formed when a plurality of dust particles floating in a gas gather at predetermined concentration, and concentration of the dust, emissivity of the dust, radiance of the dust, an absorption coefficient of the dust, and particle density of the dust in a gas are values of the dust group in a dust presence region, respectively. Furthermore, the dust particles mean individual dust particles included in the dust group, and density of the dust particles, absorption efficiency, a geometric cross-sectional area, and a radius denotes average values of the individual dust particles included in the dust group in the dust presence region, respectively. Moreover, a temperature of the dust is an average value of temperatures of the individual dust particles included in the dust group in the dust presence region.

A measuring method according to the present invention is configured to further accurately measure a temperature or the like of a object to be measured which is hard to be actually measured (measurement) like a clinker in a rotary kiln provided in, e.g., a cement manufacturing facility while considering an influence of the dust or the like other than the object to be measured which is present in the same space. Specifically, a first radiance meter is directed toward an object to be measured, and radiance is measured by the first radiance meter using at least two wavelengths through a space where the dust is present. Further, second radiance meters which are equal in number to one or more objects having temperatures different from that of the object to be measured are directed toward the objects, and radiances are measured by the second radiance meters using at least two wavelengths through the space, respectively. Furthermore, a temperature of the object to be measured, a temperature of the dust, and concentration of the dust are measured from the radiances measured by the first radiance meter and the second radiance meters. It is to be noted that, in the measuring method according to the present invention, the dust is not used as the object. Here, the description has been given as to a case where the first radiance meter and the second radiance meters are separately used, a single thermography camera having functions of both the first radiance meter and the second radiance meters may be used to measure temperatures of the object to be measured and the one or more objects with the use of at least two wavelengths, and the temperatures may be converted into luminance to be used.

First Embodiment

First, as regards the measuring method according to the present invention, an example where the number of the object is one will be described.

<Measurement of Radiances>

In the measuring method according to this first embodiment, as shown in FIG. 1, a first radiance meter 21 and a second radiance meter 22 installed outside a container 10 which contains an object to be measured 50 are used to measure a temperature or the like of the object to be measured 50 which is present in the container 10. The first radiance meter 21 measures radiance through a space where dust is present in a state where the radiance meter is directed toward the object to be measured 50 in such a manner that the object to be measured 50 is present on an optical axis. On the other hand, the second radiance meter 22 measures radiance through the space where the dust is present in a state where the radiance meter is directed toward an object 51 in such a manner that the object 51 having a temperature different from that of the object to be measured 50 is present on an optical axis. It is to be noted that FIG. 1 shows an inner wall surface of the container as the object to be measured 50. Moreover, in this first embodiment, the number of the object is one, and one second radiance meter 22 is used. Additionally, the first radiance meter 21 is provided at a position where it faces the object to be measured 50 so that the optical axis runs toward the object to be measured 50, the second radiance meter 22 is provided at a position where it faces the object 51 so that the optical axis runs toward the object 51, and they may be provided at positions so that both the optical axes become parallel to each other. Here, in case of measuring the radiances, it is desirable for concentration of the dust, a temperature of the dust, and the like between the object 51 and the second radiance meter 22 to be close to concentration of the dust, a temperature of the dust, and the like between the object to be measured 50 and the first radiance meter 21 as much as possible for improvement in a measurement accuracy. Thus, for example, in the container 10 where the object to be measured 50 and the object 51 are present, when distributions of the concentration of the dust, the temperature of the dust, and the like hardly differ, a distance between the object 51 and the object to be measured 50 and a distance between the first radiance meter 21 and the second radiance meter 22 may be either short or long. On the other hand, when the container 10 has an environment where the concentration of the dust, the temperature of the dust, and the like considerably vary depending on positions, it is preferable for the object 51 to be placed at a position adjacent to the object to be measured 50 and for the second radiance meter 22 to be provided at a position adjacent to the first radiance meter 21. It is to be noted that, in this specification, adjacency of the object 51 to the object to be measured 50 means provision within a 500-cm radius, or preferably within a 300-cm radius, or particularly preferably within a 100-cm radius from a position of the object to be measured 50. As described above, when the object 51 is present adjacent to the object to be measured 50 and the distance between the object 51 and the object to be measured 50 is reduced, environments of these objects on the optical axes of the first and second radiance meters 21 and 22 are close to each other even in an environment where the concentration of the dust, the temperature of the dust, and the like considerably vary depending on positions, an influence of the dust can be thereby assuredly eliminated, and a measurement accuracy can be improved.

As examples of the first radiance meter 21 and the second radiance meter 22 which measure radiances, there are a spectral radiance meter as well as a meter which is formed of a combination of a radiation thermometer and an arithmetic apparatus and converts a temperature measured value of the radiance thermometer into a luminance by using the Planck's formula in a later-described Expression (3). As regards the measurement of the radiances using the first radiance meter 21 and the second radiance meter 22, the measurement is carried out with the use of at least two different wavelengths. A reason for measuring the radiance which is to be measured by the first radiance meter and the radiance which is to be measured by the second radiance meter at the two wavelengths respectively is to calculate a difference between the radiances measured by each of the first radiance meter 21 and the second radiance meter 22 at the two wavelengths and to take a ratio of the differences in a measuring procedure using the later-described arithmetic expressions (later-described Expression (4), Expression (5), and the like). When the radiance is measured at the two different wavelengths and a difference of the measured values is taken, an influence of the dust can be eliminated, and an accuracy of final measured values can be improved.

For the above-described reason, it is desirable that the first radiance meter 21 and the second radiance meter 22 can simultaneously measure the radiances at a plurality of wavelengths respectively. However, even a wavelength switching type radiance meter can substantially simultaneously measure the radiances at two different wavelengths by hastening switching timing.

Further, as regards measurement wavelengths at the time of measuring the radiances by the first radiance meter 21 and the second radiance meter 22, wavelengths $\lambda_1$ and $\lambda_2$ in measurement performed by the first radiance meter 21 are the same as two wavelengths $\lambda_1$ and $\lambda_2$ in measurement performed by the second radiance meter 22, and these wavelengths are used respectively. It is to be noted that this point can be also applied to, e.g., a case using three wavelengths $\lambda_1$, $\lambda_2$, and $\lambda_3$ as the measurement wavelengths. That is because, in the measuring procedure using the later-described arithmetic expressions, the following Expression (4), Expression (5), and the like are used for improvement in an accuracy of final measured values.

Furthermore, in case of using the two wavelengths, i.e., the wavelengths $\lambda_1$ and $\lambda_2$ as the measurement wavelengths, when the wavelengths $\lambda_1$ and $\lambda_2$ are represented in units of μm, it is preferable for the wavelength $\lambda_1$ and the wavelength $\lambda_2$ to be wavelengths such that a product of their numerical values meets 0.8 or less. Consequently, the temperature of the object to be measured, the temperature of the dust, and the concentration of the dust can be measured with a higher accuracy. When the product of the wavelengths $\lambda_1$ and $\lambda_2$ becomes greater than the above condition, the measurement accuracy for the temperature of the object to be measured, the temperature of the dust, and the concentration of the dust is lowered in some situations if the blackbody cavity is not used as the object.

When the number of the object 51 is one, in the measuring method according to the first embodiment of the present invention, it is desirable for the object 51 to be an object having a lower temperature than that of the object to be measured 50. For example, if the object 51 is an object having a lower temperature, more accurate radiance of the object to be measured 50 can be calculated from measured values of radiances obtained by the first and second radiance meters 21 and 22. That is, if the object 51 is an object having a lower temperature than that of the object to be measured 50, the radiation of the object 51 itself can be ignored and hence, even in a case where a difference between measured values obtained by the first and second radiance meters 21 and 22 is considered as radiance of the object to be measured 50, errors caused in this case can be reduced. Thus, it is possible to improve an accuracy for final measured values.

To provide an effect of reducing the errors, for example, it is preferable for the object 51 to be a low-temperature object having a temperature which is 75% or less of a temperature (° C.) of the object to be measured 50, and more preferable for the object 51 to be a low-temperature object having a temperature which is 50% or less of the same. As the object having a lower temperature than that of the object to be measured, for example, an inner wall surface itself which is cooled by cooling means from the outer side of a wall surface of the container 10 facing the second radiance meter 22 in FIG. 1 can be used as the object 51. The cooling means in this case is not restricted in particular, and there are a water cooled tube, an air cooled tube, and the like buried immediately below the wall surface 10 from the outer side. Further, for example, it is possible to adopt a structure in which an inner wall surface of the container 10 has an opening end, a cylindrical concave portion protruding outward is provided, and the water cooled tube or the air cooled tube is wound around an outer periphery of the concave portion. It is to be noted that, in a case where an object to be heated (a clinker) in a rotary kiln provided in a later-described cement manufacturing facility is determined as the object to be measured and the measurement is performed, a temperature of an inner wall surface of a kiln hood generally increases to approximately 1500° C. in the cement manufacturing facility. Thus, fundamentally, it is particularly desirable for the object to be an object cooled to a temperature of 750° C. or less. However, for example, when installation of the above-described cooling means or the like is difficult due to a structure of the cement manufacturing facility to be used, a later-described discharge-end metal fitting having a temperature of approximately 1000° C. can be used as the object having a low temperature. In this case, the above-described errors can be illimitably reduced by a combination of any other means, e.g., selecting two wavelengths meeting the above-described specific condition.

Furthermore, it is desirable for the object 51 to have high emissivity, preferably 0.8 or more, and further preferably 0.9 or more. When the emissivity of the object 51 is high, radiated light from the object to be measured, a burner flame, the dust, the inner wall surface, and the like is reflected so that incidence on the second radiance meter 22 can be suppressed, and hence the measurement accuracy can be further increased.

Figure 6:
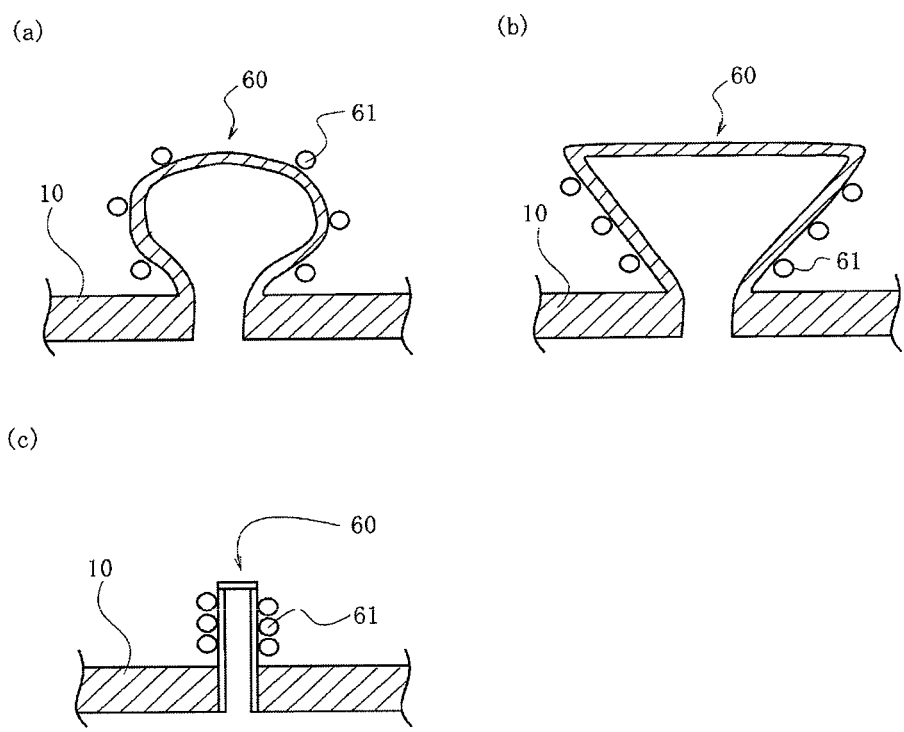
FIG. 6 is a schematic view showing an example of a blackbody cavity used in a measuring method according to the embodiment of the present invention.

As a specific example of such an object 51, a blackbody cavity provided on the wall surface (the inner wall) of the container 10 is exemplified. The blackbody cavity is formed of, e.g., such a spherical or conical cavity as shown in FIG. 6(*a*) or FIG. 6(*b*) or such a long cylindrical cavity as shown in FIG. 6(*c*) to realize a blackbody. When such a blackbody cavity 60 is used as the object 51, the radiated light which has entered the cavity is attenuated while repeating reflection or absorption in the cavity. Thus, it is possible to inhibit the radiated light which has entered the cavity from being again discharged into the container 10 from the opening end, and the high emissivity of 0.99 or more can be provided. Consequently, since the radiated light from the object to be measured, the burner flame, the dust, the inner wall surface, and the like can be inhibited from being reflected and again entering the second radiance meter 22, the measurement accuracy can be further improved. Furthermore, to reduce an influence of radiation from the blackbody cavity 60, for example, installing cooling means 61 such as water cooled tubes or air cooled tubes on an outer surface of the blackbody cavity 60 enables the reduction in a state where an inner wall surface of the blackbody cavity 60 is cooled to preferably the temperature of 750° C. or less.

Moreover, as will be described later, when the object to be heated (the clinker) in the rotary kiln provided in the cement manufacturing facility is determined as the object to be measured to carry out the measuring method, a discharge-end metal fitting which is provided at an outlet side end portion of a kiln shell and has emissivity of approximately 0.8 can be determined as the object. Since the discharge-end metal fitting has the lower emissivity than that of the blackbody cavity and its temperature when the cement manufacturing facility is operated is lowered to approximately 1000° C. at the most, hence the measuring accuracy is slightly lower than that in case of using the blackbody cavity or the like, but this metal fitting is superior in terms of easy implementation without a need for improvement or the like of the apparatus. Additionally, when there is a gap between an outer periphery of the discharge-end metal fitting which rotates with the kiln shell and an inner wall of a kiln food which does not rotate, the gap can be used as the object. Since air which cools the discharge-end metal fitting flows into the gap, a temperature of the gap is low, emissivity of the gap increases when reflection or absorption of incoming radiated light is repeated due to a depth of the gap, and the measurement accuracy can be raised. Further, as described above, the measurement accuracy can be improved by a combination with other means, e.g., selection of wavelengths to be used.

<Measurement of Temperature of Object to be Measured, Temperature of Dust, and Concentration of Dust>

Furthermore, the temperature of the object to be measured, the temperature of the dust, and the concentration of the dust are measured from the radiance measured by the first radiance meter 21 and the radiance measured by the second radiance meter 22. Considering presence of the dust, the radiance $L_{1,\lambda}$ measured by the first radiance meter 21 and the radiance $L_{2,\lambda}$ measured by the second radiance meter 22 are represented by the following Expression (1) and Expression (2), respectively. It is to be noted that, in this first embodiment, besides radiance of the object 51 and radiance of the dust, radiance emitted by the object to be measured 50 is also considered with respect to the radiance $L_{2,\lambda}$ measured toward the object 51 by the second radiance meter 22. That is because the radiance of the object to be measured which shoots the second radiance meter 22 cannot be ignored and the measurement accuracy is improved by considering it.

[Expression 1]

$$L_{1,\lambda}=(1-r_d)\varepsilon_t L_{t,\lambda}+r_d L_{d,\lambda} \qquad (1)$$

[Expression 2]

$$L_{2,\lambda}=(1-r_o)(1-r_d)\varepsilon_t L_{t,\lambda}+r_o(1-r_d)\varepsilon_o L_{o,\lambda}+r_d L_{d,\lambda} \qquad (2)$$

In Expression (1), $\varepsilon_t L_{t,\lambda}$ is radiance of the object to be measured at a wavelength $\lambda$, and it is a product of $L_{t,\lambda}$ obtained from a temperature $T_t$ of the object to be measured by the Planck's formula shown in the following Expression (3) and emissivity $\varepsilon_t$ of the object to be measured. Moreover, $r_d L_{d,\lambda}$ is radiance of the dust at the wavelength $\lambda$, and it is a product of $L_{d,\lambda}$ obtained from a temperature $T_d$ of the dust by the Planck's formula shown in the following Expression (3) and emissivity $r_d$ of the dust. Additionally, in Expression (2), $\varepsilon_o L_{o,\lambda}$ is radiance of the object at the wavelength $\lambda$, and it is a product of $L_{o,\lambda}$ obtained from a temperature $T_o$ of the object by the Planck's formula shown in the following Expression (3) and emissivity $\varepsilon_o$ of the object. It is to be noted that, in Expression (2), besides the radiance of the object 51 and the radiance of the dust, radiance of the object to be measured 50 is also considered with respect to the radiance $L_{2,\lambda}$ obtained by the second radiance meter 22 provided to face the object 51. That is because radiation from the object to be measured 50 which shoots the second radiance meter 22 cannot be ignored, and the measurement accuracy is improved by considering this radiation. Additionally, in Expression (1) and Expression (2), $r_d$ is emissivity of the dust, and it is dependent on concentration of the dust and length of a region where the dust is present. Further, $(1-r_d)$ represents a transmittance of radiated light. Furthermore, in Expression (2), $r_o$ is a contribution of the object, and it is a proportion of the radiance of the object in a sum of the radiance of the object to be measured and the radiance of the object measured by the second radiance meter. That is, there is no influence of the object to be measured when $r_o=1$, and there is no contribution of the object when $r_0=0$. Usually, the radiance of the object 50 is included in the radiance measured by the second radiance meter 22 installed to face the object 51, and hence $0<r_0<1$ is achieved.

[Expression 3]

$$L_\lambda = \frac{2C_1}{\lambda^5} \frac{1}{\exp\left(\frac{C_2}{\lambda T}\right) - 1} \quad (3)$$

In Expression (3), $C_1$ is a first radiation constant ($5.95\times10^{-17}$ W·m$^2$), $C_2$ is a second radiation constant ($1.44\times10^{-2}$ m·K), $\lambda$ is a wavelength (m), and T is a temperature (K).

Further, assuming that a difference between $L_{1,\lambda}$ represented in Expression (1) and $L_{2,\lambda}$ represented in Expression (2) is $L_{1,2,\lambda}$ and the temperature $T_o$ of the object is sufficiently lower than the temperature $T_t$ of the object to be measured, $L_{t,\lambda} \gg L_{o,\lambda}$ can be set down, and hence the following Expression (4) can be provided. Taking a difference in this manner enables not only eliminating an influence of the radiance from the dust but also eliminating an influence of the radiance from, e.g., a burner flame or a wall surface in the furnace other than the object to be measured or the object directly shooting the first and second radiance meter or scattering by the dust and then shooting the same.

[Expression 4]

$$L_{1,2,\lambda}=L_{1,\lambda}-L_{2,\lambda}=r_0(1-r_d)(\varepsilon_t L_{t,\lambda}-\varepsilon_0 L_{0,\lambda})\approx r_0(1-r_d)\varepsilon_t L_{t,\lambda} \quad (4)$$

Furthermore, when $L_{1,2,\lambda}$ is obtained at each of two wavelengths, i.e., wavelengths $\lambda_1$ and $\lambda_2$ and a ratio $L_{1,2,\lambda1}/L_{1,2,\lambda2}$ is calculated, the following Expression (5) is provided.

[Expression 5]

$$\frac{L_{1,2,\lambda1}}{L_{1,2,\lambda2}} = \frac{r_0(1-r_d)\varepsilon_t L_{t,\lambda1}}{r_0(1-r_d)\varepsilon_t L_{t,\lambda2}} = \frac{L_{t,\lambda1}}{L_{t,\lambda2}} \quad (5)$$

Moreover, when $L_{t,\lambda1}/L_{t,\lambda2}$ obtained in Expression (5) is substituted in the following expression (6) to calculate the temperature T from a ratio $L_{\lambda,1}/L_{\lambda,2}$ of radiances at two wavelengths, the temperature $T_t$ of the object to be measured can be provided. It is to be noted that, even when $r_0$, $r_d$, and $\varepsilon_t$ differ depending on $\lambda_1$ and $\lambda_2$, obtaining their ratios at $\lambda_1$ and $\lambda_2$ in advance enables calculating $L_{t,\lambda1}/L_{t,\lambda2}$.

[Expression 6]

$$T = \frac{C_2(1/\lambda_2 - 1/\lambda_1)}{\ln(L_{\lambda1}/L_{\lambda2}) + 5\cdot\ln(\lambda_1/\lambda_2)} \quad (6)$$

In Expression (6), $C_2$ is a second radiation constant ($1.44\times10^{-2}$ m·K).

Subsequently, when the following Expression (4') provided by modifying Expression (4) is used, the emissivity $r_d$ of the dust can be obtained. However, $r_0$ in Expression (4) must be separately obtained in advance, and $L_{t,\lambda}$ is calculated from $T_t$ and the Planck's formula (3).

[Expression 7]

$$r_d = 1 - \frac{L_{1,2,\lambda}}{\varepsilon_t L_{t,\lambda} r_0} \quad (4')$$

Additionally, when the following Expression (1') provided by modifying Expression (1) is used, $L_{d,\lambda}$ is determined, and substituting it in the following Expression (3') provided by modifying the Planck's formula (3) enables calculating the temperature $T_d$ of the dust. $L_{t,\lambda}$ in Expression (1') is calculated from $T_t$ and the Planck's formula (3), and $r_d$ is calculated from Expression (4').

[Expression 8]

$$L_{d,\lambda} = \frac{L_{1,\lambda} - (1-r_d)\varepsilon_t L_{t,\lambda}}{r_d} \quad (1')$$

[Expression 9]

$$T = \frac{C_2}{\lambda\ln\left(\frac{2C_1}{\lambda^5 L} + 1\right)} \quad (3')$$

It is to be noted that the temperature $T_d$ of the dust may be obtained from Expression (6) by calculating Expression (1') at two wavelengths and calculating $L_{d,\lambda1}/L_{d,\lambda2}$ with the use of the following Expression (7) which takes a ratio of Expression (1').

[Expression 10]

$$\frac{L_{d,\lambda1}}{L_{d,\lambda2}} = \frac{\frac{L_{1,\lambda1} - (1-r_d)\varepsilon_t L_{t,\lambda1}}{r_d}}{\frac{L_{1,\lambda2} - (1-r_d)\varepsilon_t L_{t,\lambda2}}{r_d}} = \frac{L_{1,\lambda1} - (1-r_d)\varepsilon_t L_{t,\lambda1}}{L_{1,\lambda2} - (1-r_d)\varepsilon_t L_{t,\lambda2}} \quad (7)$$

On the other hand, since the emissivity $r_d$ of the dust can be represented by the following Expression (8), particle density N of the dust in a gas can be obtained by giving a particle diameter of the dust, and concentration $C_d$ of the dust can be calculated by the following Expression (10).

[Expression 11]

$$r_d = 1 - \exp(-\alpha_{p,\lambda}s) \quad (8)$$

In Expression (8), $a_{p,\lambda}$ is an absorption coefficient of the dust, and it can be obtained by the following Expression (9). Furthermore, s is an optical path length (a length along which the dust is present).

[Expression 12]

$$\alpha_{p,\lambda} = Q_{abs,\lambda} A_p N \quad (9)$$

In Expression (9) $Q_{abs,\lambda}$ is absorption efficiency of each dust particle, $A_p$ is a geometrical cross section $\pi r_p^2$ of a dust particle (in units of m$^2$, and $r_p$ is a radius of a dust particle), and N is particle density of the dust in a gas (pieces/m$^3$).

[Expression 13]

$$C_d = N\frac{273\cdot15}{T_g}\frac{4}{3}\pi r_p^3 \rho \quad (10)$$

In Expression (10), $C_d$ is concentration of the dust (g/m$^3$), $T_g$ is a gas temperature in a region where the dust is present (K), and $\rho$ is density of the dust particles (g/m$^3$).

Thus, the temperature of the object to be measured, the temperature of the dust, and the concentration of the dust are measured. Calculations of the temperature $T_t$ of the object to be measured, the temperature $T_d$ of the dust, and the concentration $C_d$ of the dust from the radiance $L_{1,\lambda}$ measured by the first radiance meter 21 and the radiance $L_{2,\lambda}$ measured by the second radiance meter 22 may be manually performed, but they may be automatically carried out by calculating means using, e.g., a program of a computer 23 connected to outputs of the first radiance meter 21 and the second radiance meter 22. It is to be noted, in this embodiment, the description has been given as to the example carried out with the use of two measurement wavelengths, i.e., the wavelength $\lambda_1$ and the wavelength $\lambda_2$, but it may be also carried out with the use of more than two measurement wavelengths, e.g., three wavelengths which are the wavelength $\lambda_1$, the wavelength $\lambda_2$, and a wavelength $\lambda_3$. In this case, the temperature of the object to be measured, the temperature of the dust, and the concentration of the dust can be obtained with a higher accuracy by a method in a later-described Example 5.

Specifically, this measuring method can be used for measurement of temperatures of the objects to be measured which are an object to be heated (the clinker) in the rotary kiln provided in the cement manufacturing facility, an object to be heated present in a high-temperature furnace (heating, smelting, refining, firing, reaction, and the like) other than the rotary kiln, and a solid or a liquid flowing through a heat exchange tube in a boiler or a duct as well as a heat transfer tube, a partition wall, or the like in a heat exchanger. Moreover, the object to be measured is not restricted to one which is in a high-temperature state exceeding 1000° C. like the clinker, and it may be one which is several-hundred ° C.

Here, a specific method in case of measuring the clinker in the rotary kiln as the object to be measured in the measuring method according to the first embodiment will now be described with reference to FIG. 2 and FIG. 5.

<Apparatus>

Figure 5:
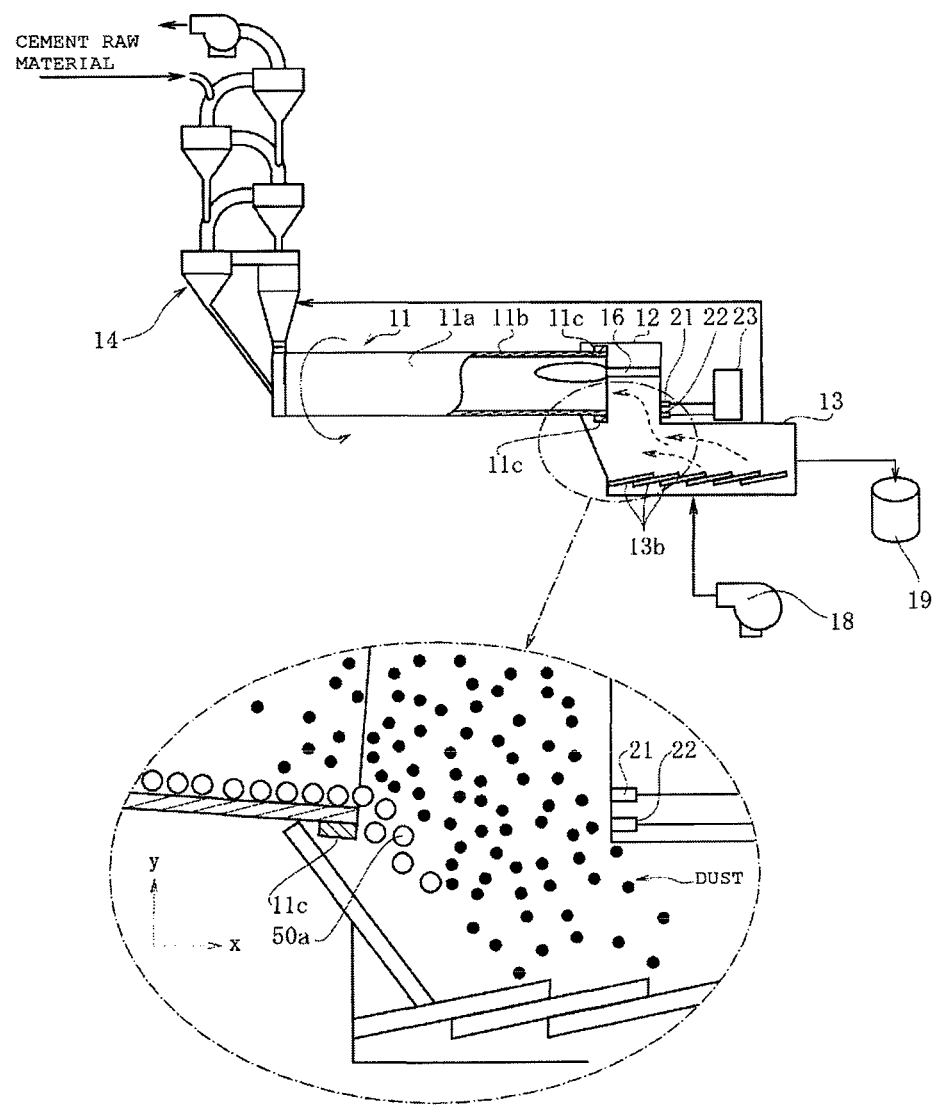
FIG. 5 is a side elevation schematically showing an outline of a cement manufacturing facility used in an embodiment of the present invention.

The apparatus shown in FIG. 5 is an example of a cement manufacturing facility which is preferable to carry out the measuring method according to the present invention, and this cement manufacturing facility 10a or 10b includes a rotary kiln 11 and a kiln hood 12 connected to this rotary kiln 11. The rotary kiln 11 is configured to manufacture clinkers by firing a cement raw material, and a preheater 14 is provided on an upstream side of the rotary kiln 11. The preheater 14 preheats the cement raw material pulverized by a non-illustrated raw material mill to a predetermined temperature so that the cement raw material can be easily fired by the rotary kiln 11 in a later process. The preheater 14 is provided with many cyclones mounted on a multistory steel frame stand. The rotary kiln 11 has a laterally-facing cylindrical kiln shell 11a which is slightly downwardly inclined toward the downstream side, and a burner 16 which faces a kiln tail is provided at an end portion of the kiln shell 11a on the downstream side. The cement raw material is temporarily fired while it is flowing down through each cyclone of the preheater 14, and then the cement raw material flows into the kiln tail portion of the rotary kiln 11. A refractory 11b such as bricks are attached to an inner wall surface of the kiln shell 11a. The cement raw material supplied from the preheater 14 is fired to provide each clinker 50a by burner flame using heavy oil or powdered coal as a fuel while the kiln shell 11a rotates in a circumferential direction (around an axial line), and the clinker 50a is supplied to the burner side. Further, to prevent the refractory lib on an outlet side from being detached or falling, a brick retaining metal fitting (which will be referred to as a discharge-end metal fitting 11c) is annularly disposed to an outlet side end portion of the kiln shell 11a.

The kiln hood 12 has an upstream end connected to a burner side end portion of the rotary kiln 11, and has a downstream end connected to a clinker cooler 13. The clinker 50a of approximately 1200 to 1500° C. which has been discharged from the burner side end portion of the rotary kiln 11 and supplied to the upstream side of the kiln hood 12 are cooled by air of 20 to 30° C. fed from a cooling ran 18 connected to the clinker cooler 13. A plurality of plates 13b are laid on a floor surface of this clinker cooler 13 from the upstream side toward the downstream side, and the aggregated clinkers 50a discharged from the burner side end portion of the rotary kiln 11 fall onto the plates 13b on the upstream side. When the plurality of plates 13b reciprocate in a front-and-back direction respectively, the clinkers 50a provided thereon are sequentially guided onto the plates 13b on the downstream side. Thus, a layer of the clinkers carried from the upstream side toward the downstream side is formed on the plurality of plates 13b in the clinker cooler 13, and the air fed from the cooling ran 18 passes through gaps between the plurality of plates 13b from the lower side of the plurality of plates 13b to cool the clinkers 50a. It is to be noted that the cooled clinkers 50a are discharged from an outlet side end portion (a downstream side end portion) of the clinker cooler 13, and the clinkers 50a discharged from this outlet side end portion are stored in a clinker silo 19. Furthermore, the air which has been fed from the cooling ran 18 and passed through the plurality of plates 13b and the clinker layer to cool the clinkers 50a flows toward the upstream side above the clinker layer as indicated by broken line arrows in FIG. 5, and is supplied to the rotary kiln 11 as combustion air in the burner 16.

Moreover, in this cement manufacturing facility 10a, to carry out the measuring method according to the embodiment of the present invention, radiance meters are provided on an outer side of a wall surface of the kiln hood 12 facing the outlet side end portion of the kiln shell 11a. As shown in FIG. 5, the radiance meters are constituted of a first radiance meter 21 which measures radiance of each clinker 50a and one or more second radiance meters 22 which measure radiance of the object 51 which is shown in FIG. 1, later-described FIG. 3, and the like. The first radiance meter 21 is provided on the outer side of the wall surface of the kiln hood 12 at a position where it faces the clinker 50a. That is, the first radiance meter 21 is provided in such a manner that the clinker 50a are present on an optical axis of the first radiance meter 21.

Moreover, the second radiance meters 22 are provided on the outer side of the wall surface at positions where they face the objects 51 and are adjacent to the first radiance meter 21, and they are provided to be equal to the objects 51 in number. It is to be noted that, in the cement manufacturing facility 10a used in the first embodiment in FIG. 5, the number of the object 51 is one, and the one second radiance meter 22 is provided as shown in FIG. 2. The second radiance meter 22 is provided in such a manner that the object 51 is present on an optical axis of the second radiance meter 22. Additionally, as described above, in the measuring method according to the present invention, an influence of radiance emitted from the clinker 50a (the object to be measured) is also taken into consideration in addition to the radiance measured by the second radiance meter. Thus, in particular, both the first and second radiance meters 21 and 22 may be installed at positions where their optical axes become parallel and, as described above, the optical axes of both the first and second radiance meters 21 and 22 may be set close to each other, namely, both a distance between the clinker 50a (the object to be measured) and the object 51 and a distance between the first radiance meter 21 and the second radiance meter 22 may be reduced to assuredly eliminate an influence of the dust. However, although the influence of the radiance emitted from the clinker 50a (the object to be measured) is taken into consideration with respect to the radiance measured by the second radiance meter 22, a measurement accuracy may be lowered in some cases when $r_0$ is close to 0 since directivity of the second radiance meter 22 is extremely poor and the distance between the object to be measured and the object is short, for example. On the other hand, since no problem arises even if the distance between the first radiance meter 21 and the second radiance meter 22 is short, the shorter distance between them is desirable to correspond to the optical axes.

Figure 2:
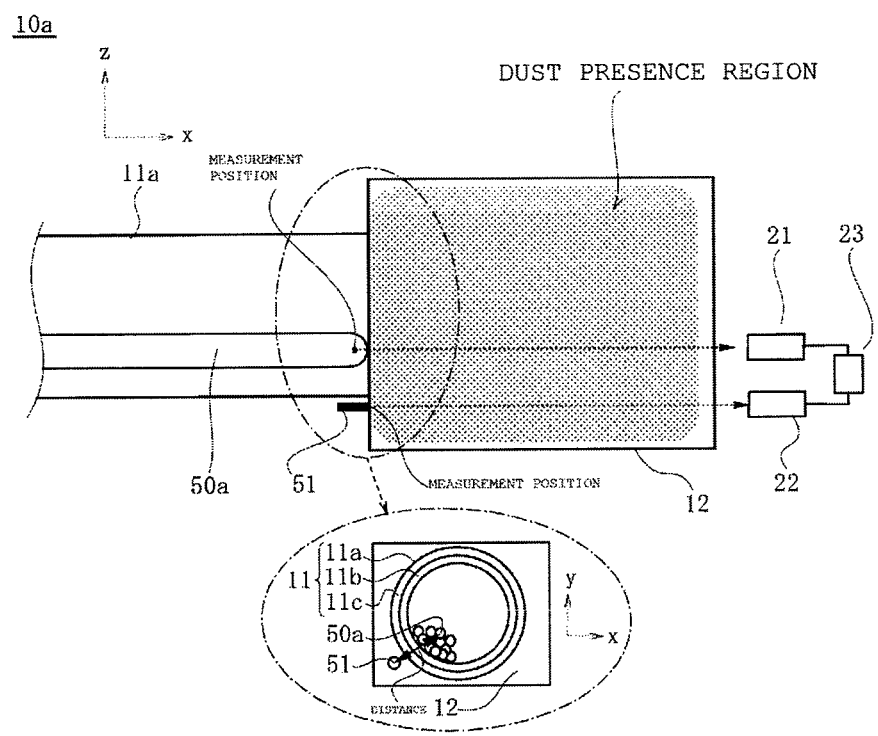
FIG. 2 is a top view schematically showing an outline of a cement manufacturing facility used in the first embodiment of the present invention.

Further, each clinker 50a shown in FIG. 2 is determined as the object to be measured 50 shown in FIG. 1, the first radiance meter 21 is directed toward the clinker 50a, and radiance is measured through a space where the dust is present with the use of at least two wavelengths as described above. On the other hand, as to the second radiance meter 22, this second radiance meter 22 is directed toward the object 51, and radiance is measured through the space where the dust is present with the use of at least two wavelengths. It is to be noted that, as described above in regard to the measurement wavelengths, the wavelengths $\lambda_1$ and $\lambda_2$ at the time of performing the measurement by the first radiance meter 21 are the same as the two wavelengths $\lambda_1$ and $\lambda_2$ used at the time of performing the measurement by the second radiance meter 22. Furthermore, in regard to the object 51, as shown in FIG. 2, it is preferable to install a blackbody cavity at a position adjacent to the clinker 50a which is present at an outlet side end portion of the kiln shell 11a, i.e., on the outer side of an outer periphery of the outlet of the kiln shell 11a and on the inner wall of the kiln hood 12, and determine it as the object 51. On the other hand, in the general cement manufacturing facility, a discharge-end metal fitting 11c is provided at the outlet side end portion of the kiln shell 11a as described above (FIG. 5). The discharge-end metal fitting 11c is cooled to approximately 1000° C. by air cooling or the like to avoid degradation due to high-temperature corrosion, this temperature is lower than a temperature of the clinker 50a, and hence the discharge-end metal fitting 11c can be determined as the object 51 shown in FIG. 1 and FIG. 2 to perform the measurement.

Then, a temperature of the clinker 50a, a temperature of the dust, and concentration of the dust are measured from the radiance measured by the first radiance meter 21 and the radiance measured by the second radiance meter 22 in accordance with the above-described procedure. It is to be noted that the description has been given as to the method for determining the clinker 50a in the rotary kiln as the object to be measured and measuring a temperature of the clinker 50a and the like, but determining, e.g., a flame of the burner 16 as the object to be measured and the blackbody cavity or the discharge-end metal fitting as the object and performing the measurement in accordance with the above-described procedure enables measuring a flame temperature of the burner 16 or the like as a temperature of the object to be measured.

Second Embodiment

The measuring method according to the present invention will now be described hereinafter while taking a case where the number of the objects is two as an example.

<Measurement of Radiance>

Figure 3:
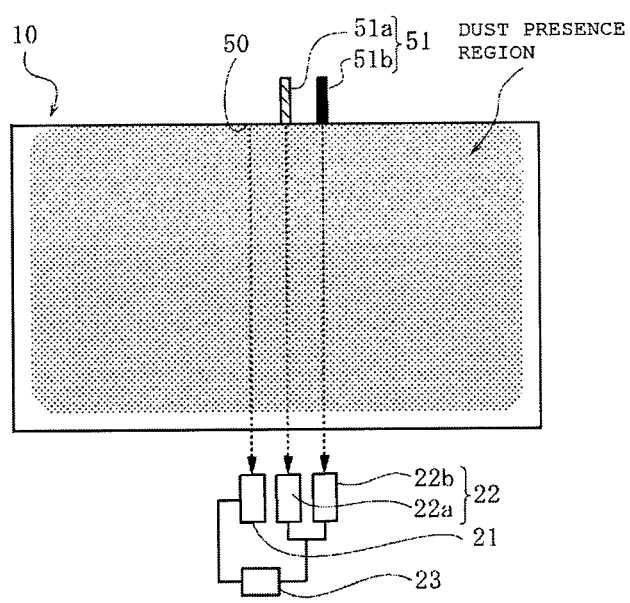
FIG. 3 is a top view to describe a measuring method according to a second embodiment of the present invention.

In this second embodiment, as shown in FIG. 3, each radiance is measured like the first embodiment except that the number of objects 51 is two, and two second radiance meters 22a and 22b are used as the second radiance meter 22.

As regards a first radiance meter 21, the first radiance meter 21 is directed toward an object to be measured 50 in such a manner that the object to be measured 50 is present on an optical axis, and measures radiance through a space where dust is present. On the other hand, as to the second radiance meters 22a and 22b, the second radiance meters 22 are directed toward objects 51a and 51b in such a manner that the objects 51a and 51b having temperatures different from that of the object to be measured 50 are present on optical axes, and measure radiances through the space where the dust is present. Further, for the same reason as that described in the first embodiment, the measurement of the radiances using the first radiance meter 21 and the second radiance meters 22a and 22b is performed with the use of at least different two wavelengths. It is to be noted that FIG. 3 shows an inner wall surface of a container 10 as the object to be measured 50. Furthermore, the first radiance meter 21 is provided at a position where it faces the object to be measured 50. On the other hand, the two second radiance meters 22a and 22b are provided at positions where they face the objects 51a and 51b respectively, and the three radiance meters may be provided at positions allowing their optical axes to become parallel. Moreover, when the inside of the container 10 is an environment such that concentration of the dust, a temperature of the dust, and the like considerably change depending on positions, it is preferable for the objects 51a and 51b to be objects installed at positions adjacent to the object to be measured 50 respectively and also preferable for the two second radiance meters 22a and 22b to be provided at positions adjacent to the first radiance meter 21 for the same reason as that described in the first embodiment.

As one of the two objects 51a and 51b, i.e., the object 51b, it is preferable to use an object having a temperature lower than that of the object to be measured 50, which is exemplified as a blackbody cavity or a discharge-end metal fitting like the first embodiment for the above-described reason. On the other hand, as the other object 51a, it is preferable to use an object having a temperature higher than that of the object to be measured 50. The other object is made to be an object 51a having higher temperature than the temperature of the object to be measured 50. Consequently, even if concentration of the dust is extremely high, it is possible to avoid a situation that radiation from the object having a high temperature is all absorbed by the dust and it cannot be detected by the second radiance meters 22a and 22b. Thus, a temperature of the object to be measured, a temperature of the dust, and concentration of the dust can be measured with a higher accuracy than that in case of performing the measurement using one object having a low temperature.

<Measurement of Temperature of Object to be Measured, Temperature of Dust, and Concentration of Dust>

Moreover, a temperature of the object to be measured, a temperature of the dust, and concentration of the dust are measured from radiance actually measured by the first radiance meter 21 and radiances actually measured by the second radiance meters 22. When presence of the dust is taken into consideration, the radiance $L_{1,\lambda}$ measured by the first radiance meter 21 is represented by the following Expression (11). Additionally, when the presence of the dust is taken into consideration, the radiance $L_{2\text{-}1,\lambda}$ and the radiance $L_{2-2,\lambda}$ measured by the two second radiance meters 22a and 22b are represented by the following Expression (12) and Expression (13). It is to be noted that, as regards one of the radiance $L_{2-1,\lambda}$ and the radiance $L_{2-2,\lambda}$, measured by the two second radiance meters 22a and 22b, i.e., the radiance $L_{2-2,\lambda}$ obtained by the second radiance meter 22b provided to face the object 51b having a lower temperature than that of the object to be measured 50, besides the radiance of the object 51b and the radiance of the dust, the radiance of the object 51b having a temperature higher than that of the object to be measured 50 is also taken into consideration. That is because the radiance of the object 51a having a high temperature which shoots the second radiance meter 22b cannot be ignored, and considering this radiance enables improving the measurement accuracy.

[Expression 14]

$$L_{1,\lambda} = (1-r_d)\varepsilon_t L_{t,\lambda} + r_d L_{d,\lambda} \quad (11)$$

In Expression (11), $\varepsilon_t L_{t,\lambda}$ is radiance of the object to be measured at the wavelength $\lambda$, and it is a product of $L_{t,\lambda}$ obtained from the temperature $T_t$ of the object to be measured by the Planck's formula (3) and the emissivity $s_t$ of the object to be measured.

[Expression 15]

$$L_{2-1,\lambda} = (1-r_d)\varepsilon_h L_{h,\lambda} + r_d L_{d,\lambda} \quad (12)$$

In Expression (12), $\varepsilon_h L_{n,\lambda}$ is radiance of the high-temperature object at the wavelength $\lambda$, and it is a product of $L_{h,\lambda}$ obtained from the temperature $T_h$ of the high-temperature object by the Planck's formula (3) and the emissivity $\varepsilon_h$ of the high-temperature object.

[Expression 16]

$$L_{2-2,\lambda} = (1-r_0)(1-r_d)\varepsilon_h L_{h,\lambda} + r_0(1-r_d)\varepsilon_l L_{l,\lambda} + r_d L_{d,\lambda} \quad (13)$$

In Expression (13), $\varepsilon_l L_{l,\lambda}$ is radiance of the low-temperature object (low) at the wavelength $\lambda$, and it is a product of $L_{l,\lambda}$ obtained from the temperature $T_l$ of the low-temperature object by the Planck's formula (3) and the emissivity $\varepsilon_l$ of the low-temperature object. Further, in Expression (11) to Expression (13), $r_d L_{d,\lambda}$ is radiance of the dust at the wavelength $\lambda$, and it is a product of $L_{d,\lambda}$ obtained from the temperature $T_d$ of the dust by the Planck's formula (3) and the emissivity $r_d$ of the dust. Furthermore, in Expression (13), $r_0$ is a contribution of the low-temperature object 51b, and it is a proportion of the radiance of the object 51b having a temperature lower than that of the object to be measured 50 in a sum of the radiance of the object 51b which is measured by the second radiance meter 22b and has a temperature lower than that of the object to be measured 50 and the radiance of the object 51a having a temperature higher than that of the object to be measured 50 shown in FIG. 3. When $r_0=1$, there is no influence of the high-temperature object 51a. When $r_0=0$, there is contribution of the low-temperature object 51b. Usually, the radiance measured by the second radiance meter 22b installed to face the low-temperature object 51b includes the radiance of the high-temperature object 51a due to the directivity of the radiance meters, and hence $0<r_0<1$ is achieved.

Moreover, assuming that a difference between $L_{2-1,\lambda}$ represented by Expression (12) and $L_{2-2,\lambda}$ represented by Expression (13) is $L_{2-1,2-2,\lambda}$ and the temperature of the object 51b which is lower than that of the object to be measured 50 is sufficiently lower than the temperature of the object 51a which is higher than that of the object to be measured 50, $L_{h,\lambda} \gg L_{1,\lambda}$ is considered to be achievable, and hence the following Expression (14) can be provided. When the difference is taken in this manner, it is possible to eliminate not only the influence of the radiance from the dust but also an influence of direct incidence of the radiance from, e.g., the object to be measured or an inner wall surface of the furnace besides both the high-temperature object 51a and the low-temperature object 51b or incidence of the same onto the first and second radiance meters 22a and 22b after being scattered by the dust.

[Expression 17]

$$L_{2-1,2-2,\lambda} = L_{2-1,\lambda} - L_{2-2,\lambda} = r_0(1-r_d)(\varepsilon_h L_{h,\lambda} - \varepsilon_l L_{l,\lambda}) \approx r_0(1-r_d)\varepsilon_h L_{h,\lambda} \quad (14)$$

Moreover, when the measurement is performed at two wavelengths, i.e., the wavelengths $\lambda_1$ and $\lambda_2$ and a ratio $L_{2-1,2-2,\lambda_1}/L_{2-1,2-2,\lambda_2}$ is calculated, the following Expression (15) is obtained.

[Expression 18]

$$\frac{L_{2-1,2-2,\lambda_1}}{L_{2-1,2-2,\lambda_2}} = \frac{r_0(1-r_d)\varepsilon_h L_{h,\lambda_1}}{r_0(1-r_d)\varepsilon_h L_{h,\lambda_2}} = \frac{L_{h,\lambda_1}}{L_{h,\lambda_2}} \quad (15)$$

Additionally, when $L_{h,\lambda_1}/L_{h,\lambda_2}$ obtained by Expression (15) is substituted in Expression (6) configured to calculate a temperature T from a radiance ratio $L_{\lambda_1}/L_{\lambda_2}$ of the two wavelengths, a temperature $T_h$ of the object having a temperature higher than that of the object to be measured can be obtained. It is to be noted that, even if $r_0$, $r_d$, and $\varepsilon_h$ differ depending on $\lambda_1$ and obtaining a ratio of each of them at $\lambda_1$ and $\lambda_1$ in advance enables calculating $L_{h,\lambda_1}/L_{h,\lambda_2}$.

Further, when the following Expression (14') provided by modifying Expression (14) is used, the emissivity $r_d$ of the dust can be calculated. However, $r_o$ must be separately obtained in advance, and $L_{h,\lambda}$ is obtained from $T_h$ and Expression (3).

[Expression 19]

$$r_d = 1 - \frac{L_{2-1,2-2,\lambda}}{r_0 \varepsilon_h L_{h,\lambda}} \quad (14')$$

Furthermore, when the following Expression (12') provided by modifying Expression (12) is used, $L_{d,\lambda}$ is obtained, and substituting it into Expression (3') provided by modifying the Planck's formula (3) enables obtaining the temperature $T_d$ of the dust. It is to be noted that Expression (12') may be calculated at two wavelengths, the following expression (16) which takes a ratio thereof may be used to calculate $L_{d,\lambda_1}/L_{d,\lambda_2}$, and the temperature $T_d$ of the dust may be obtained from Expression (6).

[Expression 20]

$$L_{d,\lambda} = \frac{L_{2-1,\lambda} - (1-r_d)\varepsilon_h L_{h,\lambda}}{r_d} \quad (12')$$

[Expression 21]

$$\frac{L_{d,\lambda_1}}{L_{d,\lambda_2}} = \frac{\dfrac{L_{2-1,\lambda_1} - (1-r_d)\varepsilon_h L_{h,\lambda_1}}{r_d}}{\dfrac{L_{2-1,\lambda_2} - (1-r_d)\varepsilon_h L_{h,\lambda_2}}{r_d}} = \frac{L_{1,\lambda_1} - (1-r_d)\varepsilon_h L_{h,\lambda_1}}{L_{1,\lambda_2} - (1-r_d)\varepsilon_h L_{h,\lambda_2}} \quad (16)$$

Moreover, $L_{t,\lambda_1}/L_{t,\lambda_2}$ can be obtained from the following Expression (17), and the temperature $T_t$ of the object to be measured can be obtained from Expression (6). Here, $L_{d,\lambda}$ can be obtained by using the temperature $T_h$ of the object which is higher than that of the object to be measured and Expression (12'), or it can be obtained by calculating $T_d$ from Expression (16) and Expression (6) and then using this $T_d$ and Expression (3) which is the Planck's formula. Additionally, $r_d$ can be calculated from Expression (14'). Consequently, it is possible to provide an effect (a two-color effect) to alleviate an influence of direct incidence of radiance from, e.g., a burner flame or an inner wall surface of the furnace besides the object to be measured or the object onto the first and second radiance meters or incidence of the same onto these radiance meters after being scattered by the dust. Here, if $\lambda_1$ and $\lambda_2$ in Expression (17) are equal to the two wavelengths $\lambda_1$ and $\lambda_2$ used in the measurement performed by the second radiance meters 22a and 22b respectively, they are simple and desirable, but they may be a combination of wavelengths of $\lambda_1$ and $\lambda_3$ or $\lambda_2$ and $\lambda_3$ as well as the wavelengths $\lambda_3$ and $\lambda_4$.

Alternatively, when the following Expression (11') provided by modifying Expression (11) is used, $L_{t,\lambda}$ is obtained, and substituting it in Expression (3') enables calculating the temperature $T_t$ of the object to be measured. However, the two-color effect cannot be provided, and an accuracy is slightly deteriorated.

[Expression 22]

$$\frac{L_{t,\lambda 1}}{L_{t,\lambda 2}} = \frac{\frac{L_{1,\lambda 1} - r_d L_{d,\lambda 1}}{(1 - r_d)\varepsilon_h}}{\frac{L_{1,\lambda 2} - r_d L_{d,\lambda 2}}{(1 - r_d)\varepsilon_h}} = \frac{L_{1,\lambda 1} - r_d L_{d,\lambda 1}}{L_{1,\lambda 2} - r_d L_{d,\lambda 2}} \quad (17)$$

[Expression 23]

$$L_{t,\lambda} = \frac{L_{1,\lambda} - r_d L_{d,\lambda}}{(1 - r_d)\varepsilon_t} \quad (11')$$

On the other hand, since the emissivity $r_d$ of the dust is represented by Expression (8), particle density N of the dust in a gas can be obtained by giving a particle diameter of the dust, concentration $C_d$ of the dust can be calculated by Expression (10).

Thus, the temperature of the object to be measured, the temperature of the dust, and the concentration of the dust are measured. As compared with the first embodiment in which the number of each of the object and the second radiance meter is one, the measuring method described in this second embodiment is superior in that the measurement accuracy for the temperature of the object to be measured when the concentration of the dust is high, the temperature of the dust, and the concentration of the dust can be improved.

Subsequently, like the first embodiment, a description will be given as to a specific method of measuring the clinker in the rotary kiln as the object to be measured in the measuring method according to this second embodiment with reference to FIG. 4 and FIG. 5. In FIG. 5, the cement manufacturing facility 10b used in this second embodiment is the same as the cement manufacturing facility 10a used in the first embodiment expect that the two second radiance meters 22a and 22b are provided as shown in FIG. 4.

That is, the first radiance meter 21 is provided in such a manner that the clinker 50a is present on the optical axis of the first radiance meter 21.

Further, one second radiance meter 22b is provided on the outer side of the wall surface of the kiln hood 12 at a position where it faces the object 51b having a temperature lower than that of the object to be measured. On the other hand, the other second radiance meter 22a is provided on the outer side of the wall surface of the kiln hood 12 at a position where it faces the object 51a having a temperature higher than that of the object to be measured. That is, the second radiance meters 22a and 22b are provided in such a manner that the respective objects 51a and 51b are present on the optical axes of the second radiance meters 22a and 22b. Furthermore, as described above, to assuredly eliminate an influence of the dust and improve the measurement accuracy, it is preferable for the objects 51a and 51b to be adjacent to the clinker 50a (the object to be measured) and for the second radiance meters 22a and 22b to be provided at positions where they are adjacent to the first radiance meter 21 in such a manner that optical axes of the three members, i.e., the first radiance meter 21 and the second radiance meters 22a and 22b become close to each other, namely, both a distance between the clinker 50a (the object to be measured) and each of the objects 51a and 51b and a distance between the first radiance meter 21 and each of the second radiance meters 22a and 22b become shorter. However, as regards the radiance measured by the second radiance meter 22b, the influence of the radiance emitted from the high-temperature object 51a is also taken into consideration, but the measurement accuracy is lowered in some situations if $r_0$ is close to 0 due to, e.g., the extremely poor directivity of the second radiance meter 22b, a short distance between the low-temperature object and the high-temperature object, and the like. On the other hand, no problem arises even if a distance between the second radiance meter 22a and the second radiance meter 22b is short, and hence the shorter distance between them is desirable to correspond to the optical axes.

Figure 4:
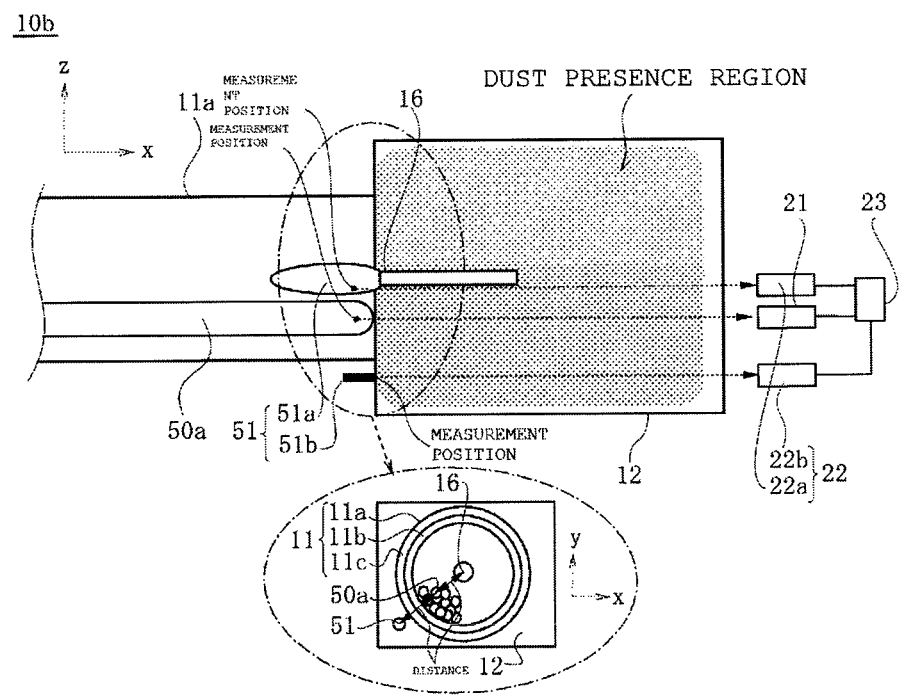
FIG. 4 is a top view schematically showing an outline of a cement manufacturing facility used in the second embodiment of the present invention.

Moreover, the clinker 50a shown in FIG. 4 is determined as the object to be measured 50 shown in FIG. 3, the first radiance meter 21 is directed toward the clinker 50a, and the radiance is measured through the space where the dust is present with the use of at least two wavelengths as described above. On the other hand, the second radiance meter 22a is directed toward the object 51a having a temperature higher than that of the clinker, the second radiance meter 22b is directed toward the object 51b having a temperature lower than that of the clinker 50a, and each radiance is measured through the space where the dust is present with the use of at least two wavelengths. It is to be noted that, as the object 51b having a temperature lower than that of the clinker 50a, using the blackbody cavity shown in FIG. 6 or the discharge-end metal fitting 11c shown in FIG. 5 as the object 51b is preferable in terms of the emissivity, temperature control, and the like. On the other hand, as regards the object 51a having a temperature higher than that of the clinker 50a, for example, a flame of the burner 16 shown in FIG. 4 and FIG. 5 can be used as this object 51a.

Then, a temperature of the clinker 50a, a temperature of the dust, and concentration of the dust are measured from the radiance measured by the first radiance meter 21, the radiance measured by the second radiance meter 22a, and the radiance measured by the second radiance meter 22b based on the above-described procedure.

Thus, according to the measuring method of the present invention, it is possible to accurately measure an object to be measured in an atmosphere where the dust is present, e.g., a temperature and the like of an object to be heated which is in a high-temperature state in a furnace in which the dust is present such as a rotary kiln provided in the cement manufacturing facility. It is to be noted that, in this embodiment, the detailed description has been given as to the first embodiment in which the object is one object having a temperature lower than that of the object to be measured and the measurement is performed while considering the radiance from the object to be measured with respect to the radiance measured by the second radiance meter and the second embodiment in which the number of the objects is two, the two objects are the object having a temperature higher than that of the object to be measured and the object having a temperature lower than that of the object to be measured, and the measurement is performed while considering the radiance from the high-temperature object in addition to the radiance from the low-temperature object, but the measurement can be likewise accurately performed even when the number of the objects is three or more. For example, in the first embodiment, it is possible to provide three or more objects, the radiance from each object and the radiance from the object to be measured are measured to further measure the temperature of the object to be measured, the temperature of the dust, and the concentration of the dust, and average them to improve the measurement accuracy. Additionally, for example, when a heating source is an industrial furnace such as a heating, smelting, refining, firing, or reaction furnace having a plurality of burner flames for a structural reason or the like of the facility, these flames can be determined as the respective high-temperature objects, a temperature of the object to be measured, a temperature of the dust, and concentration of the dust can be measured, and they can be likewise averaged, thereby improving the measurement accuracy.

EXAMPLES

Examples of the present invention as well as a comparative example will now be described in detail.

Example 1

As shown in FIG. 2, radiance of a clinker 50a present at an outlet side end portion of a kiln shell 11a was measured by a first radiance meter 21, and radiance of an object 51 was measured by a second radiance meter 22. It is to be noted that, in this example, a blackbody cavity installed on an outer side of an outlet outer periphery of the kiln shell 11a and on an inner wall of a kiln food 12 was determined as an object 51. Further, a distance between a measurement position of the object 51 and a measurement position of an object to be measured (the clinker 50a) was set to 100 cm, and a distance between the first radiance meter 21 and the second radiance meter 22 was set to 30 cm. Here, the measurement position is defined as an intersection of an optical axis of the radiance meter and the object 51 or the object to be measured (the clinker 50a).

Here, it is assumed that measurement wavelengths are two wavelengths of a wavelength $\lambda_1=0.65$ μm and a wavelength $\lambda_2=0.90$ μm, a clinker temperature $T_t=1450°$ C., emissivity $\varepsilon_t$ of the clinker=1.0, a temperature $T_d$ of the dust=1250° C., emissivity $r_d$ of the dust=0.5, a contribution $r_0$ of the object=0.6, a temperature $T_o$ of the blackbody cavity=500° C., and emissivity $\varepsilon_o$ of the blackbody cavity=1.0.

Further, when radiances $L_{1,\lambda 1}$ and $L_{1,\lambda 2}$ which should be measured by the first radiance meter 21 are calculated by Expression (1), $L_{1,\lambda 1}=1.60\times10^9$ and $L_{1,\lambda 2}=1.22\times10^{10}$ are obtained. Likewise, when radiances $L_{2,\lambda 1}$ and $L_{2,\lambda 2}$ which should be measured by the second radiance meter 22 are calculated by Expression (2), $L_{2,\lambda 1}=7.92\times10^8$ and $L_{2,\lambda 2}=6.56\times10^9$ are obtained. Then, $L_{t,\lambda 1}/L_{t,\lambda 2}$ is calculated by using Expression (4) and Expression (5), and Expression (6) is applied to a resultant to obtain $T_t=1450°$ C. (an error: 0° C.). Furthermore, the emissivity $r_d$ of the dust calculated by Expression (3) and Expression (4') was 0.5 (an error: 0.0), and the temperature $T_d$ of the dust calculated by Expression (1') and Expression (3') was 1250° C. (an error: 0° C.).

Figure 7:
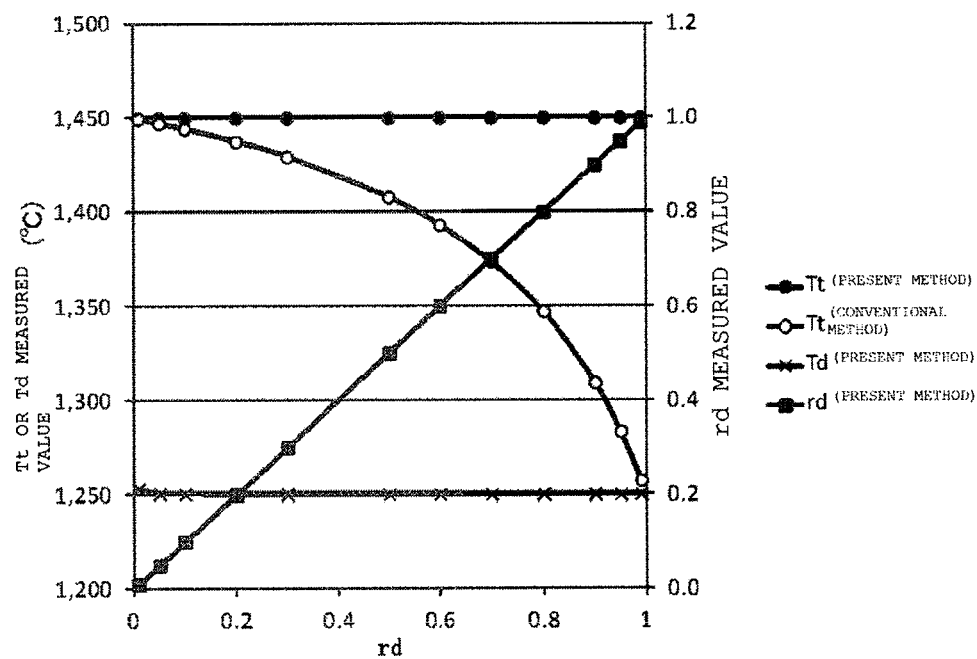
FIG. 7 is a graph showing transitions of measured values of $T_t$, $T_d$, and $r_d$ associated with changes in emissivity $r_d$ of dust in Example 1.

On the other hand, in case of performing the measurement by the two-color method which is a conventional method, when Expression (6) is used to perform the calculation from a ratio of $L_{1,\lambda 1}=1.60\times10^9$ and $L_{1,\lambda 2}=1.22\times10^{10}$ obtained above, $T_t=1408°$ C. (an error: −42° C.) is provided. It is to be noted that, since the error in the conventional method based on this two-color method is dependent on the emissivity $r_d$ of the dust, FIG. 7 shows both the clinker temperature $T_t$ measured while changing the emissivity value from 0 to 1 as well as the clinker temperature $T_t$ measured by this method (the method according to the present invention). Moreover, FIG. 7 also shows the temperature $T_d$ of the dust and the emissivity $r_d$ of the dust.

As obvious from FIG. 7, according to this method, the clinker temperature $T_t$ is constantly 1450° C. and the error is 0° C. irrespective of the emissivity $r_d$ of the dust but, according to the conventional method, it can be understood that the error is small when $r_d$ is close to 0, but the error increases as the error approximates 1, and the error eventually approximates 1250° C. which is the temperature $T_d$ of the dust. Additionally, according to this method, the temperature $T_d$ of the dust is constantly 1250° C. irrespective of the emissivity $r_d$ of the dust. Further, the emissivity $r_d$ of the dust forms a straight line having a tilt of 1, and it can be correctly obtained.

Example 2

As shown in FIG. 2, radiance of a clinker 50a present at an outlet side end portion of a kiln shell 11a was measured by a first radiance meter 21, and radiance of an object 51 was measured by a second radiance meter 22. It is to be noted that, in this Example 2, a discharge-end metal fitting 11c was used as the object 51. Further, a distance between a measurement position of the object 51 and a measurement position of an object to be measured (the clinker 50a) was set to 80 cm, and a distance between the first radiation thermometer 21 and the second radiation thermometer 22 was set to 30 cm. Here, the measurement position is determined as an intersection of an optical axis of each radiance meter and the object 51 or the object to be measured (the clinker 50a).

Like Example 1, it is assumed that measurement wavelengths are two wavelengths, i.e., a wavelength $\lambda_1=0.65$ μm and a wavelength $\lambda_2=0.90$ μm, a clinker temperature $T_t=1450°$ C., emissivity $\varepsilon_t$ of the clinker=1.0, a temperature $T_d$ of the dust=1250° C., emissivity $r_d$ of the dust=0.5, a contribution $r_0$ of the object=0.6, and a temperature $T_o$ of the discharge-end metal fitting=1000° C. It is to be noted that, if radiation from the clinker is reflected on the discharge-end metal fitting, emissivity $\varepsilon_o$ of the discharge-end metal fitting can be considered as the contribution $r_0$ of the object, and hence this emissivity is omitted.

Furthermore, when radiances $L_{1,\lambda 1}$ and $L_{1,\lambda 2}$ which should be measured by the first radiance meter 21 are calculated by Expression (1), $L_{1,\lambda 1}=1.60\times10^9$ and $L_{1,\lambda 2}=1.22\times10^{10}$ are obtained. Moreover, when radiances $L_{2,\lambda 1}$ and $L_{2,\lambda 2}$ which should be measured by the second radiance meter 22 are calculated by Expression (2), $L_{2,\lambda 1}=8.01\times10^8$ and $L_{2,\lambda 2}=6.77\times10^9$ are obtained. Then, $L_{t,\lambda 1}/L_{t,\lambda 2}$ is calculated by using Expression (4) and Expression (5), and Expression (6) is applied to a resultant to obtain $T_t=1463°$ C. (an error: 13° C.). Furthermore, the emissivity $r_d$ of the dust calculated by Expression (3) and Expression (4') was 0.55 (an error: 0.05), and the temperature $T_d$ of the dust calculated by Expression (1') and Expression (3') was 1246° C. (an error: −4° C.).

Figure 8:
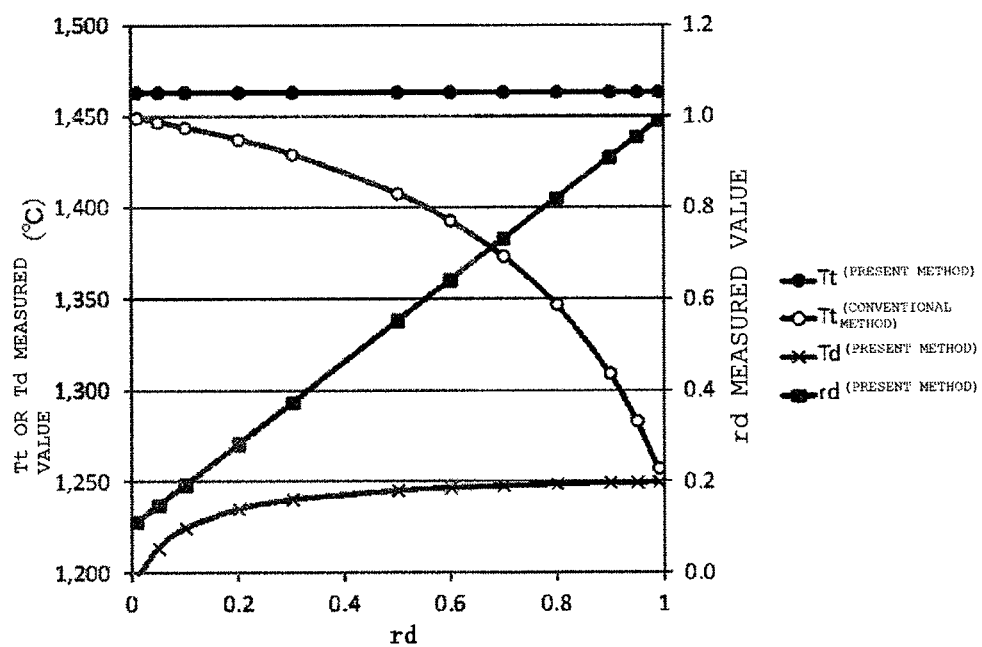
FIG. 8 is a graph showing transitions of measured values of $T_t$, $T_d$, and $r_d$ associated with changes in emissivity $r_d$ of dust in Example 2.

Like Example 1, FIG. 8 shows both the clinker temperature $T_t$ measured the two-color method which is the conventional method as well as the clinker temperature $T_t$ measured by this method (the method according to the present invention). Moreover, FIG. 8 also shows the temperature $T_d$ of the dust and the emissivity $r_d$ of the dust.

As obvious from FIG. 8, the clinker temperature $T_t$ is 1463° C. and its error is 13° C. irrespective of the emissivity $r_d$ of the dust according to this method, but it can be understood that the error is small when $r_d$ is close to 0, but the error increases as the same approximates 1, and the clinker temperature $T_t$ eventually approximates 1250° C. which is the temperature $T_d$ of the dust according to the conventional method. Additionally, according to this method, the temperature $T_d$ of the dust has the error of approximately −50 to −20° C. when $r_d$ is approximately 0.1 or less, but this temperature is substantially accurately measured when $r_d$ is approximately 0.2 or more. Further, although the emissivity $r_d$ of the dust is calculated as approximately 0.1 when $r_d=0$, it linearly rises with an increase of $r_d$, and a nearly correct value is calculated when $r_d$ is approximately 1.

Example 3

As shown in FIG. 4, radiance of a clinker 50a present at an outlet side end portion of a kiln shell 11a was measured by a first radiance meter 21, and radiances of objects 51a and 51b were measured by second radiance meters 22a and 22b respectively. It is to be noted that, in this example, a discharge-end metal fitting 11c was determined as an object 51b having a temperature lower than that of the clinker 50a and, on the other hand, a flame of a burner 16 was determined as an object 51a having a temperature higher than that of the clinker 50a. A distance between a measurement position of the low-temperature object 51b and a measurement position of an object to be measured (the clinker 50a) was set to 80 cm, a distance between a measurement position of the high-temperature object 51a and the measurement position of the object to be measured (the clinker 50a) was set to 150 cm, a distance between the first radiation thermometer 21 and the second radiation thermometer 22b was set to 30 cm, and a distance between the first radiance meter and the second radiance meter 22a was set to 70 cm. Here, the measurement position is determined as an intersection between an optical axis of each radiance meter and the object 51a or 51b or the object to be measured (the clinker 50a).

Here, it is assumed that measurement wavelengths are two wavelengths, i.e., a wavelength $\lambda_1=0.65$ μm and a wavelength $\lambda_2=0.90$ μm, a clinker temperature $T_t=1450°$ C., emissivity $\varepsilon_t$ of the clinker=1.0, a temperature $T_d$ of the dust=1250° C., emissivity $r_d$ of the dust=0.7, a contribution $r_0$ of the object=0.6, a temperature $T_1$ of the discharge-end metal fitting=1000° C., a temperature $T_h$ of the burner flame=2000° C., and emissivity $\varepsilon_h$ of the burner flame=−1.0. It is to be noted that, if radiation from the burner flame is reflected on the discharge-end metal fitting, emissivity $\varepsilon_1$ of the discharge-end metal fitting can be considered as the contribution $r_0$ of the object, and hence this emissivity is omitted.

Furthermore, when radiances $L_{2-1,\lambda 1}$ and $L_{2-1,\lambda 2}$ which should be measured by the second radiance meter 22a are calculated by Expression (12), $L_{2-1,\lambda 1}=1.85\times 10^{10}$ and $L_{2-1,\lambda 2}=5.73\times 10^{10}$ are obtained. Moreover, when radiances $L_{2-2,\lambda 1}$ and $L_{2-2,\lambda 2}$ which should be measured by the second radiance meter 22b are calculated by Expression (13), $L_{2-2,\lambda 1}=7.63\times 10^{9}$ and $L_{2-2,\lambda 2}=2.54\times 10^{10}$ are obtained. Then, $L_{h,\lambda 1}/L_{h,\lambda 2}$ is calculated by using Expression (14) and Expression (15), and Expression (6) is applied to a resultant to obtain a temperature $T_h$ of the burner flame=2002° C. (an error: 2° C.). Furthermore, as to the temperature $T_h$ of the burner flame, when the measurement is performed by the two-color method which is the conventional method and calculation is performed from a ratio of $L_{2-1,\lambda 1}=1.85\times 10^{10}$ and $L_{2-1,\lambda 2}=5.73\times 10^{10}$ obtained above by using Expression (6), $T_h=1957°$ C. (an error: −43° C.) is provided. Moreover, the emissivity $r_d$ of the dust is calculated as 0.70 (an error: 0.0) by Expression (14'), and the temperature $T_d$ of the dust is calculated as 1239° C. (an error: −11° C.) by Expression (16) and Expression (6).

Additionally, when radiances which should be measured by the first radiance meter 21 are calculated by Expression (11), $L_{1,\lambda 1}=1.16\times 10^{9}$ and $L_{1,\lambda 2}=9.59\times 10^{9}$ are obtained and, based on these values, $r_d$ (0.70) and the temperature $T_d$ of the dust (1239° C.) obtained above, Expression (17), and Expression (6) are used to calculate $T_t=1447°$ C. (an error: −3° C.).

Figure 9:
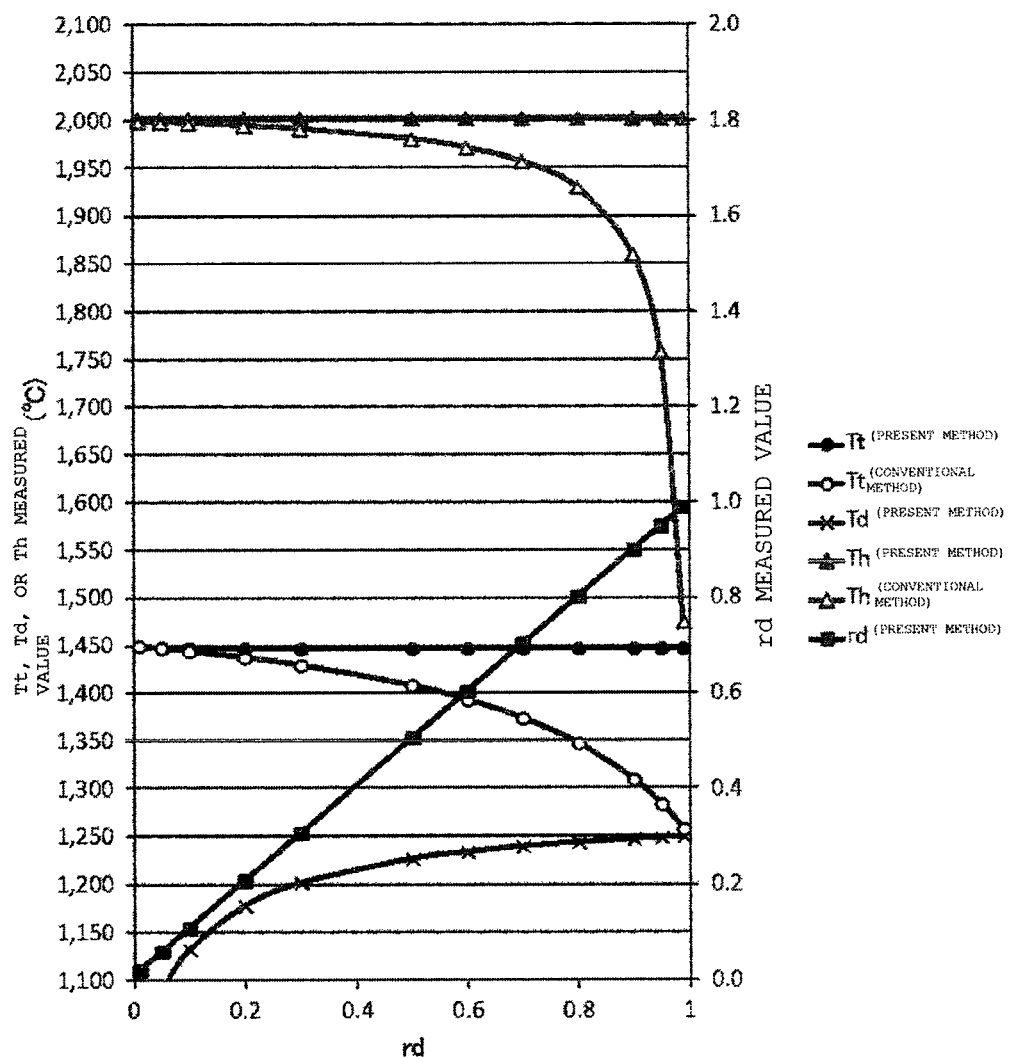
FIG. 9 is a graph showing transitions of measured values of $T_t$, $T_d$, and $r_d$ associated with changes in emissivity $r_d$ of dust in Example 3.

On the other hand, in case of performing the measurement by the two-color method which is the conventional method, when Expression (6) is used to perform the calculation from a ratio of $L_{1,\lambda 1}=1.16\times 10^{9}$ and $L_{1,\lambda 2}=9.59\times 10^{9}$ obtained above, $T_t=1373°$ C. (an error: −77° C.) is provided. It is to be noted that the error in the conventional method is dependent on the emissivity $r_d$ of the dust, FIG. 9 shows both the clinker temperature $T_t$ measured while changing the emissivity value from 0 to 1 as well as the clinker temperature $T_t$ measured by this method (the method according to the present invention). Moreover, FIG. 9 also shows the temperature $T_d$ of the dust, emissivity $r_d$ of the dust, and the temperature $T_h$ of the burner flame measured by the present method as well as the temperature $T_h$ of the burner flame measured by the conventional method.

As obvious from FIG. 9, according to this method, the clinker temperature $T_t$ is 1447° C. and its error is −3° C. irrespective of the emissivity $r_d$ of the dust but, according to the conventional method, it can be understood that the error is small when $r_d$ is close to 0, but the error increases as the error approximates 1, and the clinker temperature $T_t$ eventually approximates 1250° C. which is the temperature $T_d$ of the dust. Additionally, according to this method, the error of the temperature $T_d$ of the dust is large when $r_d$ is approximately 0.2 or less, but the error is small when $r_d$ is 0.4 or more. Further, the emissivity $r_d$ of the dust forms a straight line with a tilt of 1, and it can be correctly obtained. Furthermore, although the temperature $T_h$ of the burner flame can be accurately measured irrespective of $r_d$ according to the present invention, it can be understood that the temperature is extremely lowered when $r_d$ approximates 1 and the accuracy becomes very poor according to the conventional method.

It is to be noted that, according to this method, not only a temperature of the clinker can be accurately measured, but also a temperature of the burner flame can be correctly grasped, and hence this method is preferable for controlling an industrial furnace such as a heating, smelting, refining, firing, or reaction furnace.

Example 4

In Example 2, the measured $T_t$ is approximately 1460° C., and its error is approximately 10° C. That is because, at the time of derivation, since the radiance $L_{t,\lambda}$ of the clinker is sufficiently larger than the radiance $L_{o,\lambda}$ of the discharge-end metal fitting in Expression (4), no influence of the latter is assumed, but this influence cannot be ignored when the discharge-end metal fitting has a temperature which is as high as approximately 1000° C., and hence this error is produced. Further, since the radiance ratio of both the members differs depending on wavelengths, the error varies depending on a selection from the wavelengths $\lambda_1$ and $\lambda_2$ used for the measurement of the temperature $T_t$ of the clinker. Thus, the following Table 1 shows results obtained by changing the temperature $T_o$ of the discharge-end metal fitting and the wavelengths $\lambda_1$ and $\lambda_2$ under conditions of Example 2 and analyzing errors. Specifically, in a case where the temperature $T_o$ of the discharge-end metal fitting is one of 900° C., 1000° C., 1050° C., and 1100° C., a temperature measurement error of the clinker when the measurement is performed with a combination of wavelengths (the wavelength $\lambda_1$=0.9 µm, the wavelength $\lambda_2$=1.55 µm) widely adopted in the measuring method using a two-color thermometer was determined as a reference value (a ratio 1), and conditions to select each combination of the wavelengths with which the reference value halves, namely, a value of the ratio becomes 0.50 or less were verified under conditions of test numbers 1 to 28 shown in Table 1.

TABLE 1

| Test Number | $T_o$ [° C.] | $\lambda_1$ [µm] | $\lambda_2$ [µm] | $\lambda_1 \times \lambda_2$ | Error [° C.] | Ratio |
|---|---|---|---|---|---|---|
| 1 | 800 | 0.90 | 1.55 | 1.40 | 13.7 | 1.00 |
| 2 | 900 | 0.90 | 1.55 | 1.40 | 29.5 | 1.00 |
| 3 | | 0.50 | 1.70 | 0.85 | 14.3 | 0.48 |
| 4 | | 0.50 | 1.75 | 0.88 | 15.0 | 0.51 |
| 5 | | 0.60 | 1.50 | 0.90 | 14.7 | 0.50 |
| 6 | | 0.70 | 1.30 | 0.91 | 14.2 | 0.48 |
| 7 | | 0.70 | 1.35 | 0.95 | 15.4 | 0.52 |
| 8 | | 0.80 | 1.15 | 0.92 | 14.0 | 0.47 |
| 9 | | 0.90 | 1.05 | 0.95 | 14.5 | 0.49 |
| 10 | 1000 | 0.90 | 1.55 | 1.40 | 53.8 | 1.00 |
| 11 | | 0.50 | 1.65 | 0.83 | 26.0 | 0.48 |
| 12 | | 0.60 | 1.40 | 0.84 | 26.2 | 0.49 |
| 13 | | 0.60 | 1.45 | 0.87 | 27.7 | 0.51 |
| 14 (Example 2) | | 0.65 | 0.90 | 0.59 | 13.4 | 0.25 |
| 15 | | 0.70 | 1.20 | 0.84 | 25.9 | 0.48 |
| 16 | | 0.80 | 1.05 | 0.84 | 25.6 | 0.48 |
| 17 | | 0.80 | 1.10 | 0.88 | 27.7 | 0.51 |
| 18 | 1050 | 0.90 | 1.55 | 1.40 | 69.4 | 1.00 |
| 19 | | 0.50 | 1.65 | 0.83 | 34.7 | 0.50 |
| 20 | | 0.50 | 1.70 | 0.85 | 36.0 | 0.52 |
| 21 | | 0.60 | 1.35 | 0.81 | 34.1 | 0.49 |
| 22 | | 0.70 | 1.15 | 0.81 | 33.8 | 0.49 |
| 23 | | 0.70 | 1.20 | 0.84 | 35.9 | 0.52 |
| 24 | | 0.80 | 1.00 | 0.80 | 33.4 | 0.48 |
| 25 | 1100 | 0.90 | 1.55 | 1.40 | 87.4 | 1.00 |
| 26 | | 0.50 | 1.55 | 0.78 | 42.5 | 0.49 |
| 27 | | 0.60 | 1.30 | 0.78 | 43.7 | 0.50 |
| 28 | | 0.70 | 1.10 | 0.77 | 43.4 | 0.50 |

It has been revealed from the verification results shown in Table 1 that, when $T_o$ of the discharge-end metal fitting falls within the range of 900 to 1050° C. and the wavelength $\lambda_1$ and the wavelength $\lambda_2$ are wavelengths whose numerical product meets 0.8 or less when these wavelengths are represented in units of µm respectively, the errors can be halved. It is to be noted that the temperature $T_o$ of the discharge-end metal fitting was changed in the range of 800 to 1100° C. but, at 800° C., the error is small from the beginning even in case of a combination of the wavelengths (the wavelength $\lambda_1$=0.9, the wavelength $\lambda_2$=1.55) which is extensively adopted in the measuring method using the two-color thermometer, and the combination of the wavelengths does not have to be changed. Furthermore, at 1100° C., the errors are large in case of the combinations of the wavelengths extensively adopted in the measuring method using the two-color thermometer and, even if the errors are improved by selecting combinations of the wavelengths, the conditions are not suitable for practical use. Moreover, when the clinker temperature $T_t$ provided by this method is used, the emissivity $r_d$ of the dust obtained by Expression (3) and Expression (4'), the concentration of the dust obtained from this value, and the temperature $T_d$ of the dust calculated by Expression (1') and Expression (3') or Expression (7) and Expression (6) become values with higher accuracies.

Example 5

In Example 2, the measurement was performed at three wavelengths, i.e., a wavelength $\lambda_1$=0.65 µm and a wavelength $\lambda_2$=0.90 µm as well as a wavelength $\lambda_3$=1.35 µm, and a temperature $T_t(\lambda_1 \text{ and } \lambda_2)$ and a temperature $T_t(\lambda_2 \text{ and } \lambda_3)$ of a clinker were measured at combinations of two wavelengths ($\lambda_1$=0.65 µm, $\lambda_2$=0.90 µm) and ($\lambda_2$=0.90 µm, $\lambda_3$=1.35 µm), respectively.

An error is produced in the measured $T_t$ since luminance $L_{o,\lambda}$ of a discharge-end metal fitting cannot be ignored to luminance $L_{t,\lambda}$ of the clinker in Expression (4) in a derivation process. Thus, in a plurality of combinations of the clinker temperature $T_t$ and the discharge-end metal fitting temperature $T_o$ at $\lambda_1$ and $\lambda_2$, $L_{1,2,\lambda1}/L_{1,2,\lambda2}$ calculated by the following Expression (18) and $T_t(\lambda_1, \lambda_2, T_t, T_o)$ calculated by Expression (6) are obtained. Then, at $\lambda_2$ and $\lambda_3$, the same calculations are carried out to obtain $T_t(\lambda_2, \lambda_3, T_t, T_o)$. It is to be noted that emissivity $\varepsilon_t$ of the clinker was set to 1 in the following Expression (18). Furthermore, assuming that radiation from the clinker is reflected on the discharge-end metal fitting, since emissivity $\varepsilon_o$ of the discharge-end metal fitting in Expression (4) can be considered as a contribution $r_0$ of an object, this emissivity was omitted.

[Expression 24]

$$\frac{L_{1,2,\lambda1}}{L_{1,2,\lambda2}} = \frac{r_0(1-r_d)(\varepsilon_t L_{t,\lambda1} - L_{0,\lambda1})}{r_0(1-r_d)(\varepsilon_t L_{t,\lambda2} - L_{0,\lambda2})} = \frac{\varepsilon_t L_{t,\lambda1} - L_{0,\lambda1}}{\varepsilon_t L_{t,\lambda2} - L_{0,\lambda2}} \quad (18)$$

Moreover, $T_t$ can be obtained from measurement values of the temperatures $T_t(\lambda_1, \lambda_2)$ and $T_t(\lambda_2, \lambda_3)$ of the clinker by using a regression formula provided by performing statistical processing to these pieces of data. $T_t$ was set to 1550, 1500, . . . , 1200, or 1150° C. whilst $T_o$ was set to 1200, 1100, . . . 600, or 500° C. (where $T_t > T_o$), the regression formula to calculate $T_t$ from $T_t(\lambda_1, \lambda_2)$, $T_t(\lambda_2, \lambda_3) - T_t(\lambda_1, \lambda_2)$, $(T_t(\lambda_2, \lambda_3) - T_t(\lambda_1, \lambda_2))^2$, and the following Expression (19) was provided.

$$T_t = 1.0252 T_t(\lambda_1, \lambda_2) + 0.2198(T_t(\lambda_2, \lambda_3) - T_t(\lambda_1, \lambda_2)) - 0.02257(T_t(\lambda_2, \lambda_3) - T_t(\lambda_1, \lambda_2))^2 - 35.0 \quad (19)$$

Figure 10:
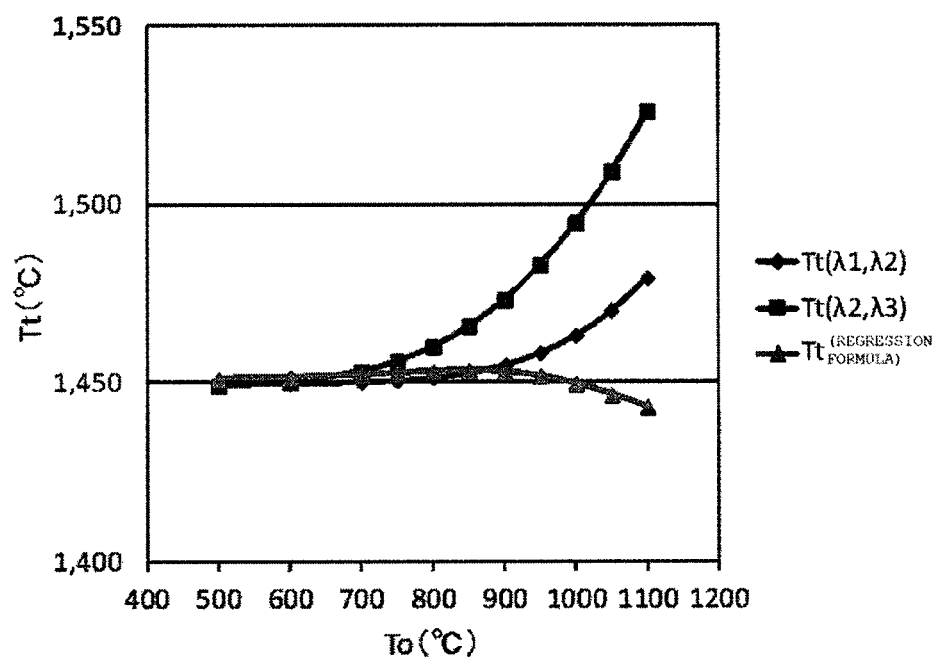
FIG. 10 is a graph showing evaluation results of a measuring method described in Example 5.

In Example 2, $T_t(\lambda_1, \lambda_2)$ was 1463° C., and $T_t(\lambda_2, \lambda_3)$ obtained by changing the wavelengths alone was 1495° C. Thus, it can be understood that, when $T_t$ is calculated by using Expression (19), 1450° C. (an error: 0° C.) is provided, and the measurement accuracy was greatly improved. Here, FIG. 10 shows $T_t(\lambda_1, \lambda_2)$ and $T_t(\lambda_2, \lambda_3)$ when the discharge-end metal fitting temperature $T_o$ in Example 2 was changed and $T_t$ obtained by this method. It can be understood from FIG. 10 that using this method enables highly accurately measuring the clinker temperature $T_t$ even if a temperature of the discharge-end metal fitting is high. Further, when the obtained clinker temperature $T_t$ is used, the emissivity $r_d$ of the dust obtained by Expression (3) and Expression (4'), the concentration of the dust obtained from this value, or the temperature $T_d$ of the dust calculated by Expression (1') and Expression (3') or Expression (7) and Expression (6) becomes a highly accurate value.

INDUSTRIAL APPLICABILITY

The present invention can be preferably used for measuring a temperature or the like of, e.g., a clinker in a high-temperature state in a furnace where dust is present like a rotary kiln provided in, e.g., a cement manufacturing facility.

REFERENCE SIGNS LIST 21 first radiance meter
22 second radiance meter
50 object to be measured
51 object

The invention claimed is:

1. A method of calculating a temperature of an object to be measured, a temperature of dust, and a concentration of the dust, comprising:
   directing a first radiance meter toward the object to be measured and measuring a radiance of the object to be measured through a space where the dust is present using at least two wavelengths by the first radiance meter;
   directing second radiance meters, which are equal in number to one or more objects having temperatures different from that of the object to be measured, toward the one or more objects having temperatures different from that of the object to be measured, and measuring radiances of the one or more objects having temperatures different from that of the object to be measured through the space with the use of at least two wavelengths by the second radiance meters respectively; and
   calculating the temperature of the object to be measured, the temperature of the dust, and the concentration of the dust from the radiances of the object to be measured and the one or more objects having temperatures different from that of the object to be measured that were measured by the first radiance meter and the second radiance meters.

2. The method according to claim 1, wherein the one or more objects having temperatures different from that of the object to be measured are blackbody cavities.

3. The method according to claim 1, wherein the object to be measured is an object to be heated in a rotary kiln.

4. The method according to claim 3, wherein the one or more objects having temperatures different from that of the object to be measured are blackbody cavities.

5. The method according to claim 3, wherein the one or more objects having temperatures different from that of the object to be measured is a discharge-end metal fitting of a rotary kiln.

6. The method according to claim 1, wherein the one or more objects having temperatures different from that of the object to be measured are two objects which are air object having a temperature higher than that of the object to be measured and an object having a temperature lower than the object to be measured.

7. The method according to claim 6, wherein:
   the object to be measured is an object to be heated in a rotary kiln,
   the object having a temperature higher than that of the object to be measured is a flame of a burner, and
   the object having a temperature lower than that of the object to be measured is a discharge-end metal fitting provided in the rotary kiln.

8. The method according to claim 1, wherein measurement wavelengths for radiances are two wavelengths which are a wavelength $\lambda_1$ and a wavelength $\lambda_2$, and a numerical product of these wavelengths meets 0.8 or less when they are represented in units of μm.

9. The method according to claim 1, wherein:
   the measuring the radiance of the object to be measured and the one or more objects having temperatures different from that of the object to be measured is carried out using three different wavelengths, and
   the temperature of the object to be measured, the temperature of the dust, and the concentration of the dust are calculated using the measured radiances at a first combination of two of the three different wavelengths and the measured radiances at a second combination of two of the three different wavelengths, the second combination being different from the first combination.

10. The method according to claim 3, wherein measurement wavelengths for radiances are two wavelengths which are a wavelength $\lambda_1$ and a wavelength $\lambda_2$, and a numerical product of these wavelengths meets 0.8 or less when they are represented in units of μm.

11. The method according to claim 5, wherein measurement wavelengths for radiances are two wavelengths which are a wavelength $\lambda_1$ and a wavelength $\lambda_2$, and a numerical product of these wavelengths meets 0.8 or less when they are represented in units of μn.

12. The method according to claim 6, wherein measurement wavelengths for radiances are two wavelengths which are a wavelength $\lambda_1$ and a wavelength $\lambda_2$, and a numerical product of these wavelengths meets 0.8 or less when they are represented in units of μm.

13. The method according to claim 7, wherein measurement wavelengths for radiances are two wavelengths which are a wavelength $\lambda_1$ and a wavelength $\lambda_2$, and a numerical product of these wavelengths meets 0.8 or less when they are represented in units of μm.

14. The method according to claim 3, wherein:
   the measuring the radiance of the object to be measured and the one or more objects having temperatures different from that of the object to be measured is carried out using three different wavelengths, and
   the temperature of the object to be measured, the temperature of the dust, and the concentration of the dust are calculated using the measured radiances at a first combination of two of the three different wavelengths and the measured radiances at a second combination of two of the three different wavelengths, the second combination being different from the first combination.

15. The method according to claim 5, wherein:
   the measuring the radiance of the object to be measured and the one or more objects having temperatures different from that of the object to be measured is carried out using three different wavelengths, and the temperature of the object to be measured, the temperature of the dust, and the concentration of the dust are calculated using the measured radiances at a first combination of two of the three different wavelengths and the measured radiances at a second combination of two of the three different wavelengths, the second combination being different from the first combination.

16. The method according to claim 6, wherein:

the measuring the radiance of the object to be measured and the one or more objects having temperatures different from that of the object to be measured is carried out using three different wavelengths, and the temperature of the object to be measured, the temperature of the dust, and the concentration of the dust are calculated using the measured radiances at a first combination of two of the three different wavelengths and the measured radiances at a second combination of two of the three different wavelengths, the second combination being different from the first combination.

17. The method according to claim 7, wherein:

the measuring the radiance of the object to be measured and the one or more objects having temperatures different from that of the object to be measured is carried out using three different wavelengths, and the temperature of the object to be measured, the temperature of the dust, and the concentration of the dust are calculated using the measured radiances at a first combination of two of the three different wavelengths and the measured radiances at a second combination of two of the three different wavelengths, the second combination being different from the first combination.

* * * * *

UNITED STATES PATENT AND TRADEMARK OFFICE
CERTIFICATE OF CORRECTION

PATENT NO. : 10,852,195 B2
APPLICATION NO. : 15/758835
DATED : December 1, 2020
INVENTOR(S) : Hirokazu Shima et al.

It is certified that error appears in the above-identified patent and that said Letters Patent is hereby corrected as shown below:

In the Claims

Column 28, Line 1 Claim 6, change "air" to --an-- before object.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*